US011393649B2

(12) United States Patent
Grossberg et al.

(10) Patent No.: US 11,393,649 B2
(45) Date of Patent: Jul. 19, 2022

(54) RELAY ARRAY FOR GRID CONNECTION

(71) Applicant: Solaredge Technologies Ltd., Herzeliya (IL)

(72) Inventors: Amir Grossberg, Tel Aviv (IL); Yoav Berger, Petah Tikva (IL); Reuven Savitzky, Hod HaSharon (IL); Dor Shoshani, Tel Aviv (IL); Elad Toraty, Holon (IL); Liron Har-Shai, Tel Mond (IL); Matan Atias, Tel Aviv (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 16/803,555

(22) Filed: Feb. 27, 2020

(65) Prior Publication Data

US 2020/0279707 A1    Sep. 3, 2020

Related U.S. Application Data

(60) Provisional application No. 62/811,884, filed on Feb. 28, 2019.

(51) Int. Cl.
| | | |
|---|---|---|
| *H02M 7/5387* | (2007.01) | |
| *H01H 47/22* | (2006.01) | |
| *H01H 47/00* | (2006.01) | |
| *H02J 3/00* | (2006.01) | |

(52) U.S. Cl.
CPC .......... *H01H 47/22* (2013.01); *H01H 47/002* (2013.01); *H02J 3/00* (2013.01)

(58) Field of Classification Search
CPC .. H02J 3/00; H01H 9/54; H01H 47/22; H01H 47/004; H01H 47/002
See application file for complete search history.

(56) References Cited

U.S. PATENT DOCUMENTS

| | | | |
|---|---|---|---|
| 4,631,627 A | 12/1986 | Morgan | |
| 2001/0035755 A1* | 11/2001 | Shirato | H01H 47/325 |
| | | | 324/418 |
| 2010/0226160 A1* | 9/2010 | Prior | H01H 47/002 |
| | | | 363/132 |

(Continued)

FOREIGN PATENT DOCUMENTS

WO    2018134050 A1    7/2018

OTHER PUBLICATIONS

Sep. 23, 2020—EP 20160138.2—European Search Report.

*Primary Examiner* — Jared Fureman
*Assistant Examiner* — Esayas G Yeshaw
(74) *Attorney, Agent, or Firm* — Banner & Witcoff, Ltd.

(57) ABSTRACT

A relay array may connect an electrical device (e.g., an inverter, power converter, etc.) to a utility grid. Based on a detection of a power interruption or fault, the relay array may disconnect the electrical device from the grid to ensure safety or reduce damage to the electrical device or grid. The relay array may include one or more electromechanical relays (e.g., latching relays). A safety catch may prevent the latching relay(s) from changing states. The electrical device may be configured to facilitate removal of the safety catch once the ability to change states is desired. The latching relay(s) may also be supplied with a power pulse for changing a state of the latching relay(s). The power pulse may be provided by a power bank that may be maintained with power in case of a power interruption or fault.

23 Claims, 14 Drawing Sheets

(56) References Cited

U.S. PATENT DOCUMENTS

| | | | |
|---|---|---|---|
| 2014/0265585 A1* | 9/2014 | Della Sera | H02J 3/383 307/52 |
| 2018/0054064 A1* | 2/2018 | Narla | H02J 3/383 |
| 2018/0147947 A1* | 5/2018 | Gebhart | B60L 50/51 |

* cited by examiner

RELAY ARRAY FOR GRID CONNECTION

CROSS-REFERENCE TO RELATED APPLICATIONS

This application is a non-provisional of and claims priority to U.S. Provisional Patent Application No. 62/811,884, filed Feb. 28, 2019, which is hereby incorporated by reference in its entirety.

BACKGROUND

In some electrical applications, an electrical device (e.g., a power generation circuit, an inverter) may comprise, according to standards and regulations, an automatic switching circuit (e.g., a circuit breaker). The automatic switching circuit may disconnect the electrical device from a grid (e.g., distribution grid, distributed generator, loads, home panels), based on an interruption or a fault (e.g., high current, high voltage, unintentional feeding of the circuitry into a sub grid or a stand-alone grid) detected by a control circuit. The switching circuit may perform as a protective mechanism to ensure a safety function (e.g., anti-islanding).

Standards and regulations (e.g., IEC 62109-1, VDE 0126-1-1, VDE AR-N 4105) may require that a switching circuit may disconnect the electrical device from the grid by controlling two serially connected and independently activated switches along each current or conductor connecting the electrical device to the grid, for example a phase conductor or a neutral conductor.

In some examples, a common practice for meeting this requirement is to use relays having appropriate specifications, such as contact current rating (e.g., a maximum amount of current a relay may be able to conduct), voltage rating, switching capacity, etc. As the contact current rating or the voltage rating increases, the size and the cost of the relays may increase significantly.

The type of relays that may usually be used in such examples is normally open, where the switching contact of the relay is connected and conducts when the relay gate receives operational power above a threshold.
Therefore, as long as the electronic device operates, the automatic switching circuit may be actively connected throughout the operation and may consume power (e.g., quiescent power) continuously.

In power electronics, there is an ever-present need to reduce power consumption, size, cost and/or the like. Thus, there is a need for an automatic switching circuit that may connect and disconnect the component from the grid, in a cost-effective way while consuming a low amount of power.

SUMMARY

The following summary is a short summary of some of the inventive concepts for illustrative purposes only, and is not intended to limit or constrain the inventions and examples in the detailed description.

Aspects of the disclosure herein may employ systems (or parts thereof) and methods for a relay array for connecting an electrical device (e.g., an inverter, a power converter) to a grid. The relay array may also function as a circuit breaker and/or a protective mechanism to prevent high current/voltage or unintentional feeding of the electrical device into a sub grid or a stand-alone grid, often referred to as anti-islanding operation. Based on an interruption (e.g., the grid "going down") or a fault detection, the relay array may disconnect the circuit from the grid to ensure safety and to prevent damage to the electrical device or the grid. The relay array may be coupled with the outputs of or incorporated into the electrical device.

Standards and regulations may require a connection to the grid via an automatic switching circuit, such as a relay array, that may ensure a disconnection of the electrical device from the grid based on an occurrence of an error or an interruption. For safety reasons, a relay array and a control system/circuit attributed to the relay array may incorporate one or more redundancies, to be able to ensure a disconnection even in the event of one or more simultaneous errors and interruptions.

The relay array may comprise a plurality of relay legs and a control circuit. Each relay leg may connect between an output of the electrical device (e.g., an inverter, a power converter) to a grid connection (e.g., bus, distribution line, input terminal of the grid). For example, a single-phase electrical device may have two buses (e.g., phase and neutral) connecting the electrical device to the grid, such that the relay array may comprise two relay legs. In another example, a three-phase electrical device may have three buses connecting the electrical device to the grid, such that the relay array may comprise three relay legs.

For the aforementioned redundancy, each of the relay legs may feature at least two relays or relay contacts, to ensure a disconnection of the grid even in the event of a damaged or inactive relay. Each of the relays may comprise a switching contact. Each switching contact may be controlled by a control coil, such that when an electric current is passed through the control coil a magnetic field may be generated to activate a mechanism (e.g., an electromechanical mechanism such as an electromagnet) that controls the switching contact, thereby making or breaking a connection of the switching contact (e.g., changing the switching contact configuration). The switching contacts of the same relay leg may be controlled by at least two different control coils, to cover a scenario where one of the control coils or the control circuit is malfunctioning.

According to aspects of the disclosure herein, at least one of the relay legs may comprise at least one latching relay. A latching relay may be an electromechanical relay (e.g., mechanical, magnetic, impulse, etc.) that may maintain either an ON (connected) or an OFF (disconnected) contact configuration/position indefinitely without power applied to the control coil. The latching relay may consume power only for an instant when the relay is being switched and the latching relay switching contact(s) retains the setting throughout a power outage. Hence, a latching relay may be used to control large currents by using smaller currents that drive the control coil.

The latching relay may use a power pulse, an amount of power supplied to the latching relay temporarily (e.g., 100-1000 ms). The power pulse may generate a magnetic field at the control coil of the latching relay and activate an electromechanical mechanism that may change the switching contact configuration/position (e.g., conducting/ON or non-conducting/OFF). After the changing of the switching contact configuration/position, the latching relay may maintain the switching contact configuration/position (e.g., connected or disconnected), even when the power pulse may be removed, thereby reducing significantly the dissipated power during steady-state operation.

Latching relays may provide benefits of reduced electrical circuit size due to their relatively small size, and may provide lower conduction losses, leading to a more efficient circuit. Moreover, latching relays may provide a comparatively cost-effective solution for employing high current relays. That is, using latching relays may provide benefits of reduced manufacturing costs.

As noted above, this Summary is merely a summary of some of the features described herein and is provided to introduce a selection of concepts in a simplified form that are further described below in the Detailed Description. The Summary is not exhaustive, is not intended to identify key features or essential features of the claimed subject matter, and is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

DETAILED DESCRIPTION

Figure 1:
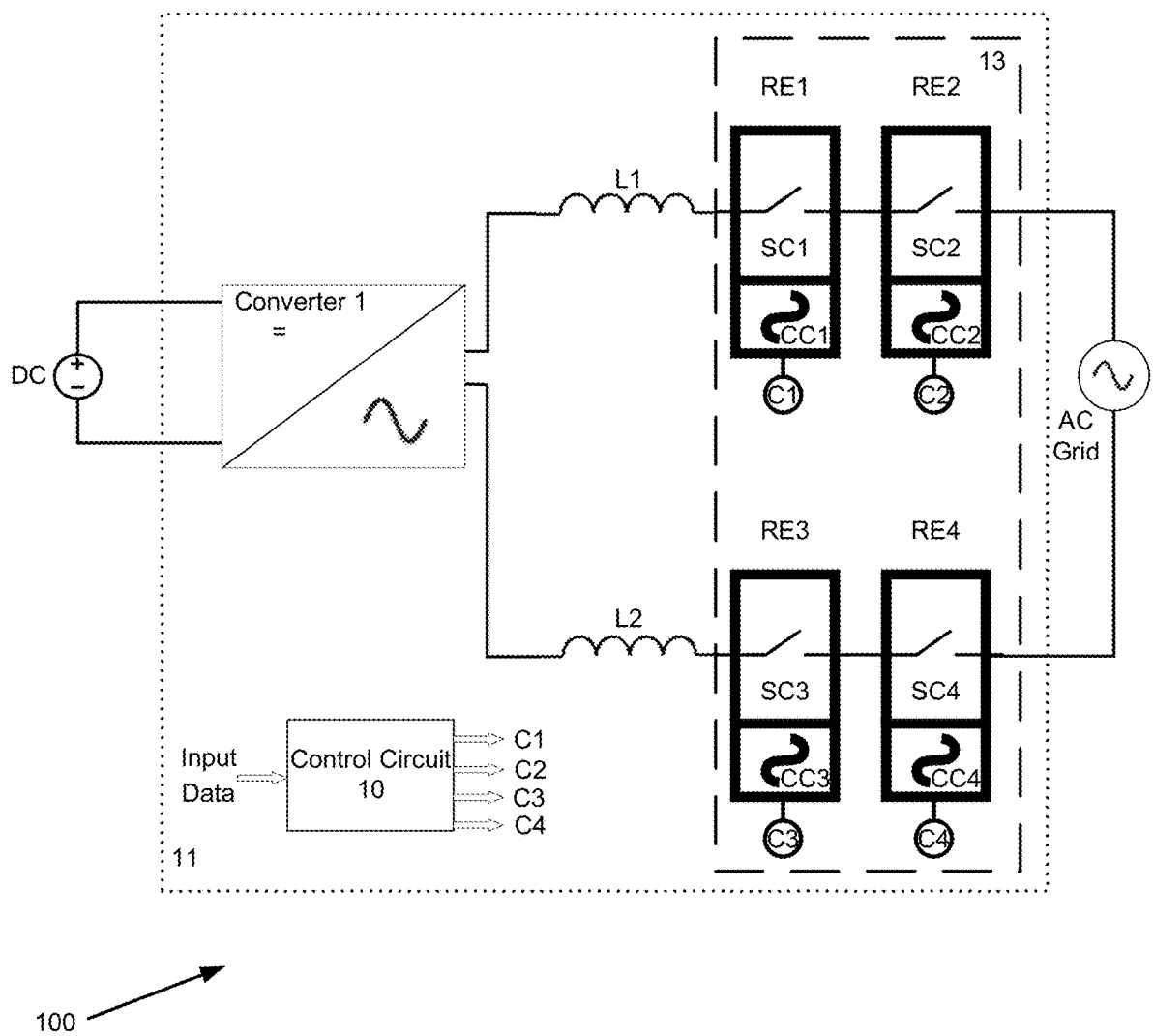
FIG. 1 illustrates a diagram of an electrical circuit according to aspects of the disclosure.

In the following description of various aspects of the disclosure, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

To reduce power consumption in electrical/power circuits, a latching relay (e.g., a relay that may maintain either ON or OFF contact configuration/position indefinitely without power applied to the coil) may be used. For example, a latching relay may be used to connect an electrical device (e.g., inverter) to a second electrical device/system/network, such as an electrical grid. In such case, the latching relay may be used as a circuit breaker that automatically operates as an electrical switch designed to protect the electrical device (e.g., an inverter, a power converter) from damage (e.g., caused by excess current from an overload or short circuit), or to prevent a converter from supplying power to a malfunctioning utility grid, where the switch may have a feature for electronically connecting and/or disconnecting the electrical device to/from the grid.

Aspects of the disclosure provided herein include electrical devices that comprise a relay array comprising one or more latching relays. The one or more latching relays may be an effective solution to the problem of power consumption of an automatic switching circuit coupled or incorporated into an electrical device, when the device is connected to a second electrical device/system/network. Using the one or more latching relays may provide benefits of decreased amount of dissipated energy and decreased device size due to the relatively small size of the latching relays. Furthermore, latching relays are comparatively cost-effective solution for high current relays, such that using one or more latching relays may provide benefits of reduced manufacturing costs.

A latching relay may use a power pulse, e.g., an amount of power supplied to the latching relay temporarily (e.g., 100-1000 ms). The power pulse may generate a magnetic field at the control coil of the latching relay and activate an electromechanical mechanism that may change the switching contact configuration (e.g., conducting/connected/ON or non-conducting/disconnected/OFF). After the changing of the switching contact configuration, the latching relay may maintain the switching contact configuration (e.g., connected/ON or disconnected/OFF), even when the power pulse may be removed, potentially reducing the dissipated power during steady-state operation. The switching contact configuration may be maintained until a subsequent power pulse is applied, at which time the switching contact configuration changes/toggles back to the other configuration (e.g., disconnected/OFF or connected/ON). According to some aspects, the energy for generating the power pulse may be provided by the grid or a local power supply that is internal or external to the electrical device (e.g., inverter).

The use of one or more latching relays in a relay array and the need for a power pulse to change the switching contact configuration may require a distributed and/or redundant control system. The distributed control system may detect a fault or an interruption (e.g., overload, short-circuits) and may create one or more control signals. One or more control coil driver circuits may receive the one or more control signals and may generate an electric current passing through the control coil(s). The electric current may induce a magnetic field to activate the electromechanical mechanism of the relay and to change the switching contact configuration.

According to some aspects, the control circuit and system may support scenarios where an immediate disconnection from the grid or a malfunction of the local power supply occurs, such that the power source/energy required to generate the power pulse may be unavailable. Therefore, the control circuit may comprise or be coupled to a power bank (e.g., one or more capacitive elements (e.g., capacitors), a battery, or both) that may store enough energy to generate the power pulse to change the switching contact configuration.

According to some aspects, the latching relay may be a single-coil latching relay, a dual-coil latching relay or a multi-coil latching relay. A single-coil latching relay may use only one coil to set or reset the switch position, such that both positive and negative voltages may be applied across the single-coil. For example, when a positive voltage is applied, a current may flow in one direction and enter the relay into the set-state (e.g., relay switch closed). A negative voltage may reverse the current direction, placing the relay into the reset-state (e.g., switch opened).

A dual-coil latching relay may have a set-coil and a reset-coil. For example, when the set-coil is energized, the relay may enter the set-state (e.g., switch closed). Conversely, when the reset coil is energized, the relay may enter the reset-state (e.g., switch opened). The set-coil and the reset-coil might not be energized at the same time, but each of them may require its own power source or driver.

In aspects of the disclosure herein, two or more relay contacts of a relay array may be provided using a multi-pole relay module. A multi-pole relay module incorporates a plurality of relays in a single package. A multi-pole relay module may enable the use of a common control coil for more than one relay contact, thereby reducing the size and the costs of the system. For example, a dual-pole relay module may have two contacts controlled by a single control coil, making a second control coil surplus to requirements, thereby reducing the relay array size, the dissipated energy during operation, the manufacturing costs, and/or the like.

In aspects of the disclosure herein, the relays of the relay array may use a different electrical contact configuration (e.g., single-pole single-throw [SPST], single-pole double-throw [SPDT], double-pole single-throw [DPST]). For example, when the relay array comprises two or more relays, using a DPST relay (e.g., a pair of switches or relays actuated by a single coil) may reduce the consumed energy for driving the control coils of the relay.

In aspects of the disclosure herein, the control circuit and system may comprise a monitoring circuit that is used to detect and recover from controller malfunctions. The control circuit and system may include one or more hardware processors, digital signal processing [DSP] circuits, field programmable gate array [FPGA] devices, and/or the like. The monitoring circuit may provide redundancy for malfunctioning elements and circuits of the control system. For example, the monitoring circuit may receive a timer reset (e.g., a pulse width modulation [PWM] signal) from the controller at predetermined intervals (e.g., every 50 µs). In case the timer reset was changed or has not arrived, the monitoring circuit may generate a signal to start a process (e.g., of driving the control coil to change the switching contact state/position and disconnect the electrical device from the grid). For example, a case where the timer reset was changed may be when the controller makes a decision to change the switching contact state/position to nonconducting/OFF and disconnect the electrical device. Another example for a case where timer reset was changed or has not arrived may be when the controller is malfunctioning and the monitoring circuit may function as a back-up and redundant element for the controller and may generate a signal for changing the switching contact configuration/position to nonconducting/OFF in order to disconnect the electrical device from the grid.

Reference is now made to FIG. 1, which illustrates a diagram of an electrical circuit comprising a relay array according to aspects of the disclosure herein. System 100 includes a direct current (DC) power source (e.g., a photovoltaic [PV] solar panel, PV module, PV array/string, a DC-DC converter), a single-phase alternating current (AC) grid (e.g., one phase of a multiphase (e.g., three-phase) AC grid), and an inverter circuit 11. The inverter circuit 11 may comprise a DC-AC converter 1, inductive elements L1 and L2, control circuit 10, and a relay array 13 comprising relays RE1-RE4. Each of relays RE1-RE4 comprises a corresponding switching contact SC1-SC4 and a corresponding control coil CC1-CC4 respectively.

According to some aspects, at least one of relays RE1-RE4 may be a latching relay (e.g., a relay that may maintain either contact configuration/position indefinitely without power applied to the coil). For example, relays RE1 and RE3 may be latching relays, and relays RE2 and RE4 may be non-latching relays, such that each inverter output is connected to a relay leg featuring one latching relay and one non-latching relay. Connecting each inverter output to a relay leg featuring one latching relay and one non-latching relay may reduce the size, cost and losses of converter 1 compared to a design including two non-latching relay contacts to each output, and may be configured to operate in a reliable and safe manner.

The current path comprising relays RE1-RE2 may be collectively referred to as a first relay leg (e.g., a bus, a phase). The first relay leg may further comprise inductive element L1. The current path comprising relays RE3-RE4 and may be collectively referred to as a second relay leg. The second relay leg may further comprise inductive element L2. Each of the first relay leg and the second relay leg (e.g., a bus, a phase) may be connected between an output terminal of converter 1 to a corresponding grid connection terminal.

Each of the switching contacts SC1-SC4 may be controlled by a corresponding control coil CC1-CC4 respectively. Each of the control coils CC1-CC4 may be driven by control signals C1-C4 generated by control circuit 10. Control circuit 10 may generate control signals C1-C4 according to a logic system and input data received by control circuit 10. For example, the input data may include a measurement of one or more electrical parameters of system 100, an enable signal generated by a FPGA or controller, or an interruption detected (e.g., high voltage/current measurement) in one of the components of system 100. The input data may be measured by one or more sensors (e.g., voltage/current sensor) incorporated into or coupled with inverter circuit 11. The input data may also be or include measurements on one or more parameters of a grid (e.g., a single phase grid, or one phase of a multiphase grid) connected to the inverter output.

Inductive elements L1 and L2 may represent the inductance of various inductive elements coupled to the first and second relay legs, such as, for example, a filter inductor, differential inductor, common-mode-choke inductor, etc. The various inductive elements represented in L1 and L2 may be coupled with different elements along the relay leg. According to some aspects, some of the inductive elements may be coupled: (i) between an output terminal of converter 1 and a first switching contact (e.g., relay RE1, relay RE3); (ii) between a first switching contact and a second switching contact (e.g., between relays RE1 and RE2, between relays RE3 and RE4); and/or (iii) between a second switching contact (e.g., relay RE2, relay RE4) and the connection to the (e.g., single-phase) AC grid.

The input terminals of converter 1 may be coupled across a DC power source, and may input power to converter 1 during operation of converter 1. Converter 1 may convert the DC power to an AC power, which depending on the state of the switching contacts SC1-SC4 may enable electrical current flow through the first relay leg and second relay led to feed power to the AC grid. Electrical current may flow from the DC power source to the AC grid when all switching contacts are connected (ON) and conduct electricity.

Figure 2:
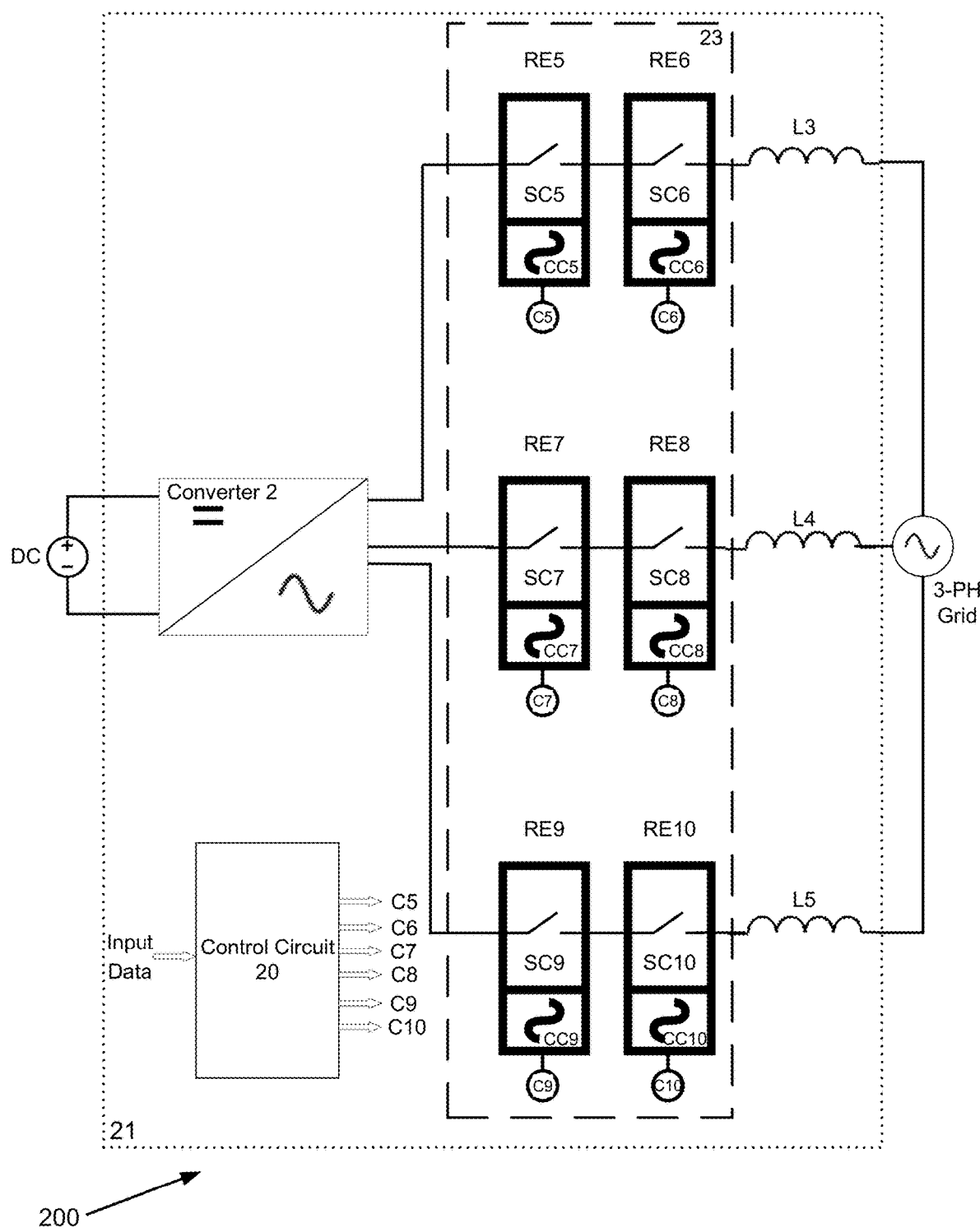
FIG. 2 illustrates a diagram of an electrical circuit according to aspects of the disclosure.

Reference is now made to FIG. 2, which illustrates a diagram of an electrical circuit according to aspects of the disclosure herein. System 200 includes a direct current (DC) power source (e.g., a photovoltaic [PV] solar panel, PV module, PV array/string, a DC-DC converter), a three-phase alternating current (AC) grid and inverter circuit 21 comprising DC-AC converter 2, inductive elements L3-L5, control circuit 20 and a relay array 23 comprising relays RE5-RE10. Each of relays RE5-RE10 comprises a corresponding switching contact SC5-SC10 and a corresponding control coil CC5-CC10 respectively.

According to some aspects, at least one of relays RE5-RE10 may be a latching relay (a relay that may maintain either conducting/ON or non-conducting/OFF contact configuration/position indefinitely without power applied to the coil).

The current path comprising relays RE5-RE6 may be collectively referred to as a first relay leg (e.g., a bus, a phase). The current path comprising relays RE7-RE8 may be collectively referred to as a second relay leg. The current path comprising relays RE9-RE10 may be collectively referred to as a third relay leg. Each of the first relay leg, the second relay leg, and the third relay leg may connect between an output terminal of converter 2 to a corresponding grid connection terminal and represent one of the three phases of the grid. The first, second, and third relay legs may include, or be connected in series to, inductive elements L3, L4 and L5, respectively.

Each of the switching contacts SC5-SC10 may be controlled by a corresponding control coil CC5-CC10. Each of the control coils CC5-CC10 may be driven by a corresponding control signal C5-C10 generated by control circuit 20. Control circuit 20 may generate control signals C5-C10 according to a logic system and input data received by control circuit 20. For example, the input data may be a measurement of one or more electrical parameters of system 200, an enable signal generated by a controller (e.g., FPGA, DSP), or an interruption detected in one of the components of system 200. The input data may be measured by one or more sensors (e.g., voltage/current sensor) incorporated into or coupled with inverter circuit 21.

Inductive elements L3-L5 may represent the inductance of various inductive elements coupled across the corresponding relay leg, such as, for example, a filter inductor, differential inductor, common-mode-choke inductor, etc. The various inductive elements represented in L3-L5 may be coupled with different elements along the relay leg (e.g., phase, bus). For example, according to some aspects, some of the inductive elements may be coupled: (i) between an output terminal of converter 2 and a first switching contact (e.g., relay RE5, relay RE7, relay RE9); (ii) between a first switching contact and a second switching contact (e.g., between relays RE5 and RE6, between relays RE7 and RE8, between relays RE9 and RE10); and/or (iii) between a second switching contact (e.g., relay RE6, relay RE8, relay RE10) and the connection to the three-phase AC grid.

The input terminals of converter 2 may be coupled across a DC power source, which may input power to converter 2 during operation of converter 2. Converter 2 may convert the DC power to an AC power, which depending on the state of the switching contacts SC5-SC10 and the control signals C5-C10 generated by control circuit 20, may flow through the relay paths (e.g., first, second, and third relay legs) to feed power to the AC grid. Power may flow from the DC power source to the AC grid when all switching contacts are connected and conducting electricity.

Figure 3:
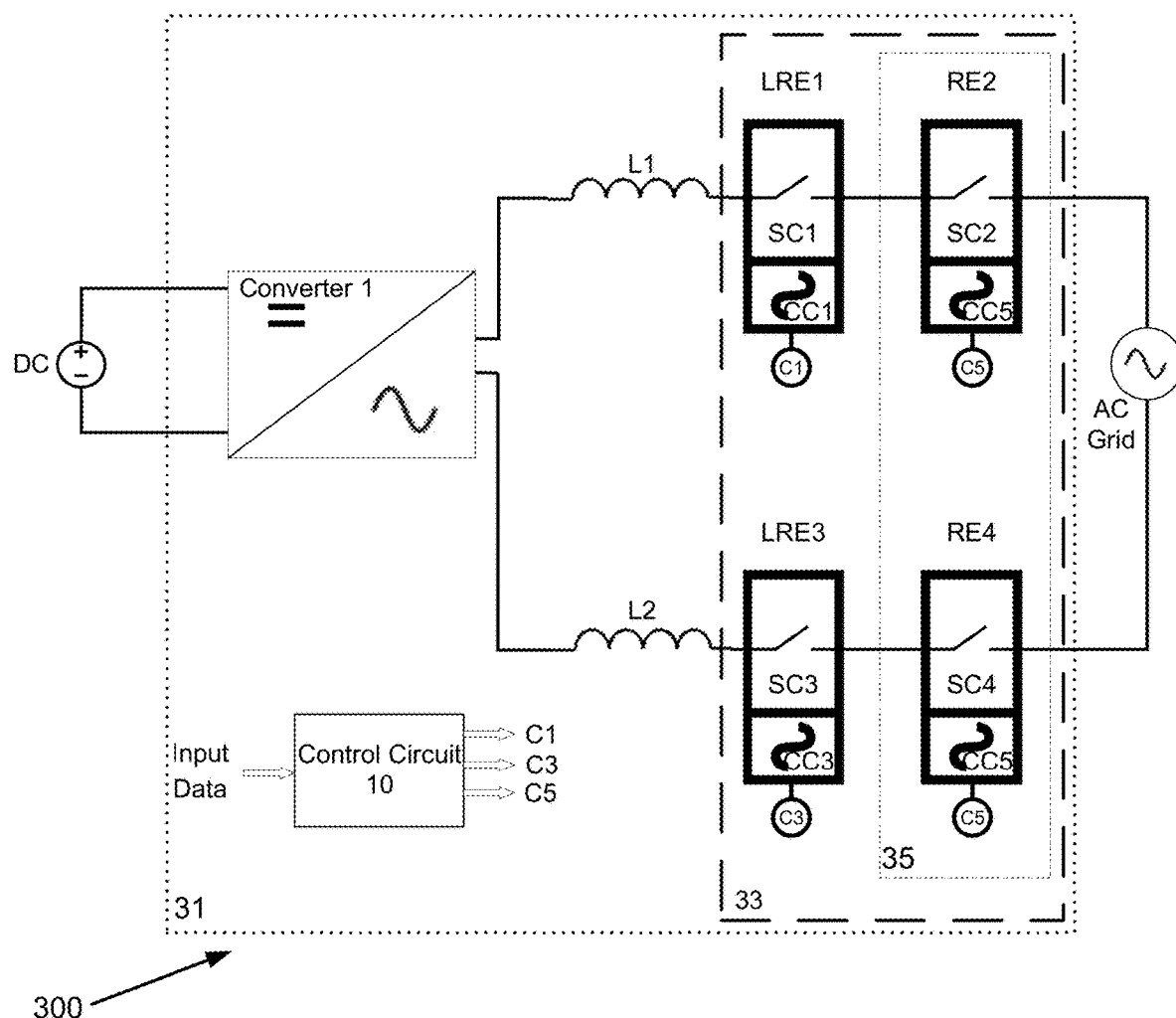
FIG. 3 illustrates a diagram of an electrical circuit according to aspects of the disclosure.

Reference is now made to FIG. 3, which illustrates a diagram of an electrical system 300, an example of system 100 of FIG. 1, according to aspects of the disclosure.

According to some aspects, a single relay contact in each relay leg may be a latching relay. For example, in FIG. 3, relays RE1 and RE3 of FIG. 1 are implemented with latching relays LRE1 and LRE3 comprising switching contacts SC1 and SC3 respectively and control coils CC1 and CC3 respectively.

According to some aspects, a plurality of relays (two or more) of the relay array may be implemented with a multi-pole relay module. For example, dual-pole relay 35 may comprise relays RE2 and RE4 that may share a common control coil CC5 (elements denoted CC5 in the figure may be the same element) driven by control signal C5 which may be generated by control circuit 10. For example, using a dual-pole relay module 35 may provide the benefits of reduced size of electrical system 300, reduced dissipated energy during operation of electrical system 300, and/or reduced manufacturing costs.

In this example, the current path comprising latching relay LRE1 and relay RE2 may be collectively referred to as a first relay leg. The current path comprising latching relay LRE3 and relay RE4 may be collectively referred to as a second relay leg. Each of the first relay leg and the second relay leg may be connected between an output terminal of converter 1 to a corresponding grid connection terminal.

In this example, DC-AC converter 1, inductive elements L1 and L2, control circuit 10, and a relay array 33 comprising relays RE2, RE4 and latching LRE1 and LRE3 may be collectively referred to as inverter circuit 31.

Figure 4:
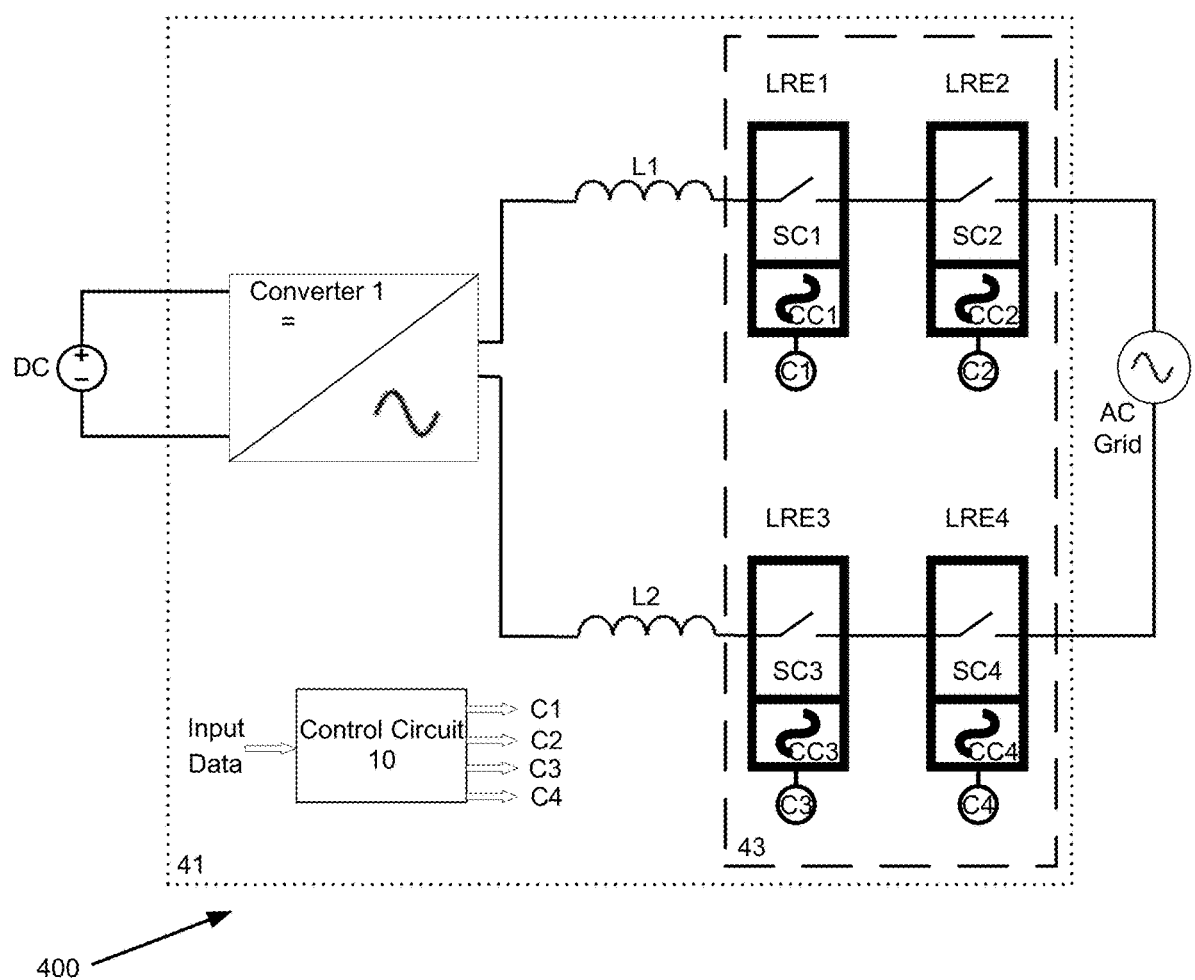
FIG. 4 illustrates a diagram of an electrical circuit according to aspects of the disclosure.

Reference is now made to FIG. 4, which illustrates a diagram of an electrical system 400, an example of system 100 of FIG. 1, according to aspects of the disclosure. According to some aspects, each relay leg may comprise at least two latching relays. For example, in FIG. 4, relays RE1-RE4 of FIG. 1 are implemented with latching relays LRE1-LRE4 respectively, which comprise switching contacts SC1-SC4 respectively and control coils CC1-CC4 respectively.

In this example, the current path comprising latching relays LRE1-LRE2 may be collectively referred to as a first relay leg. The current path comprising latching relays LRE3-LRE4 may be collectively referred to as a second relay leg. Each of the first relay leg and the second relay leg may be connected between an output terminal of converter 1 to a corresponding grid connection terminal.

According to some aspects, a plurality of relays (two or more) of different relay legs (e.g., first relay leg and second relay leg) of the relay array may be implemented with a multi-pole relay module. For example, according to some aspects, latching relays LRE2 and LRE4 may share a first common control coil driven by a first common control signal generated by control circuit 10, and latching relays LRE1 and LRE3 may share a second common control coil driven by a second common control signal. Using a dual relay module may provide the benefits of reduced size of electrical system 400, reduced dissipated energy during operation of electrical system 400, and reduced manufacturing costs.

According to some aspects, latching relays LRE1-LRE4 may be incorporated into a single module having one or more control coils. The digital logic of control circuit 10 may be used to generate control signals C1-C4. Where regulations might not require more than one control coil for each relay leg, a single control coil may control all of latching relays LRE1-LRE4. Where regulations require control coil redundancy, more than one control coil may be used, as described above.

In this example, DC-AC converter 1, inductive elements L1 and L2, control circuit 10, and a relay array 43 comprising latching relays LRE1-LRE4 may be collectively referred to as inverter circuit 41.

Figure 5:
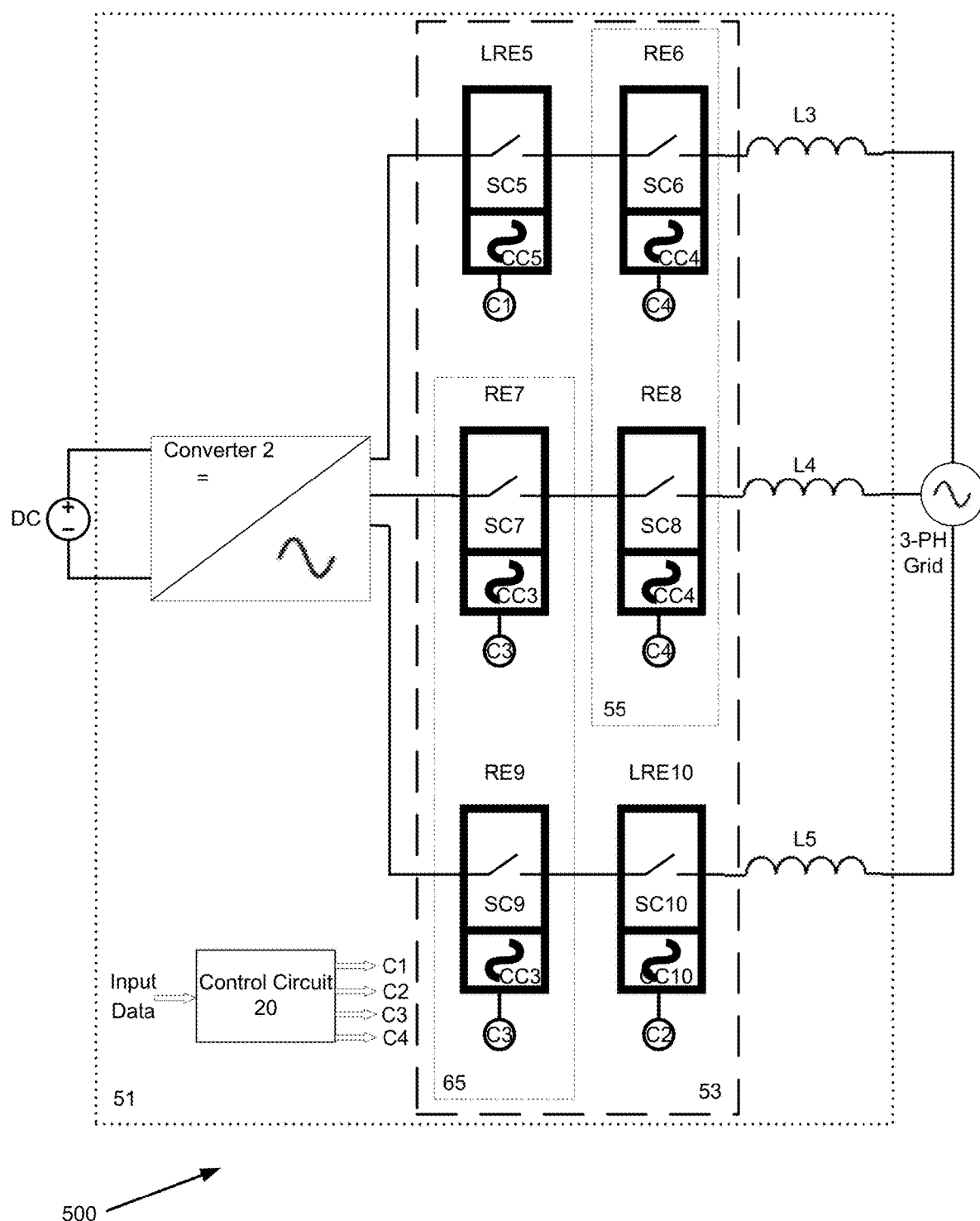
FIG. 5 illustrates a diagram of an electrical circuit according to aspects of the disclosure.

Reference is now made to FIG. 5, which illustrates a diagram of an electrical system 500, an example of system 200 of FIG. 2, according to aspects of the disclosure.

According to some aspects, at least one of the relays or relay contacts of at least one relay leg may be a latching relay. For example, in FIG. 4, relays RE5 and RE10 of FIG. 1 are implemented with latching relays LRE5 and LRE10 respectively comprising switching contacts SC5 and SC10 respectively and control coils CC5 and CC10 respectively.

In this example, the first current path that connects converter 2 and the three-phase grid and comprises latching relay LRE5, relay RE6, may be collectively referred to as a first relay leg. The second current path that connects converter 2 and the three-phase grid and comprises relays RE7-RE8 may be collectively referred to as a second relay leg. The third current path that connects converter 2 and the three-phase grid and comprises latching relay LRE10, relay RE9 may be collectively referred to as a third relay leg.

According to some aspects, a plurality of relays (two or more) of the relay array may be implemented with a multi-pole relay module. For example, dual-pole relay 55 may comprise relays RE6 and RE8 that may share a common control coil CC4 (elements denoted CC4 in the figure may be the same element) driven by control signal C4, which may be generated by control circuit 20. Dual-pole relay 65 may comprise relays RE7 and RE9 that may share a common control coil CC3 (elements denoted CC3 in the figure may be the same element) driven by control signal C3, which may be generated by control circuit 20. Using dual-pole relay modules 55 and 65 may provide benefits of reduced size of electrical system 500, reduced dissipated energy during operation of electrical system 500, and reduced manufacturing costs.

In this example, DC-AC converter 2, inductive elements L3-L5, control circuit 20 and a relay array 53 comprising relays RE6, RE7-RE9, and latching relays LRE5 and LRE10 may be collectively referred to as inverter circuit 51.

According to some aspects, latching relays LRE5 and LRE10 may be incorporated into a single module (e.g., dual-pole relay) having one or more control coils. The digital logic of control circuit 20 may be used to generate control signals C1 and C2.

According to some aspects, the relay array 53 may be controlled by only two control signals generated by control circuit 20, where latching relay LRE5 and dual-pole relay 65 may share a common control coil driven by a common control signal, and latching relay LRE10 and dual-pole relay 55 may share a common control coil driven by a common control signal.

Figure 6:
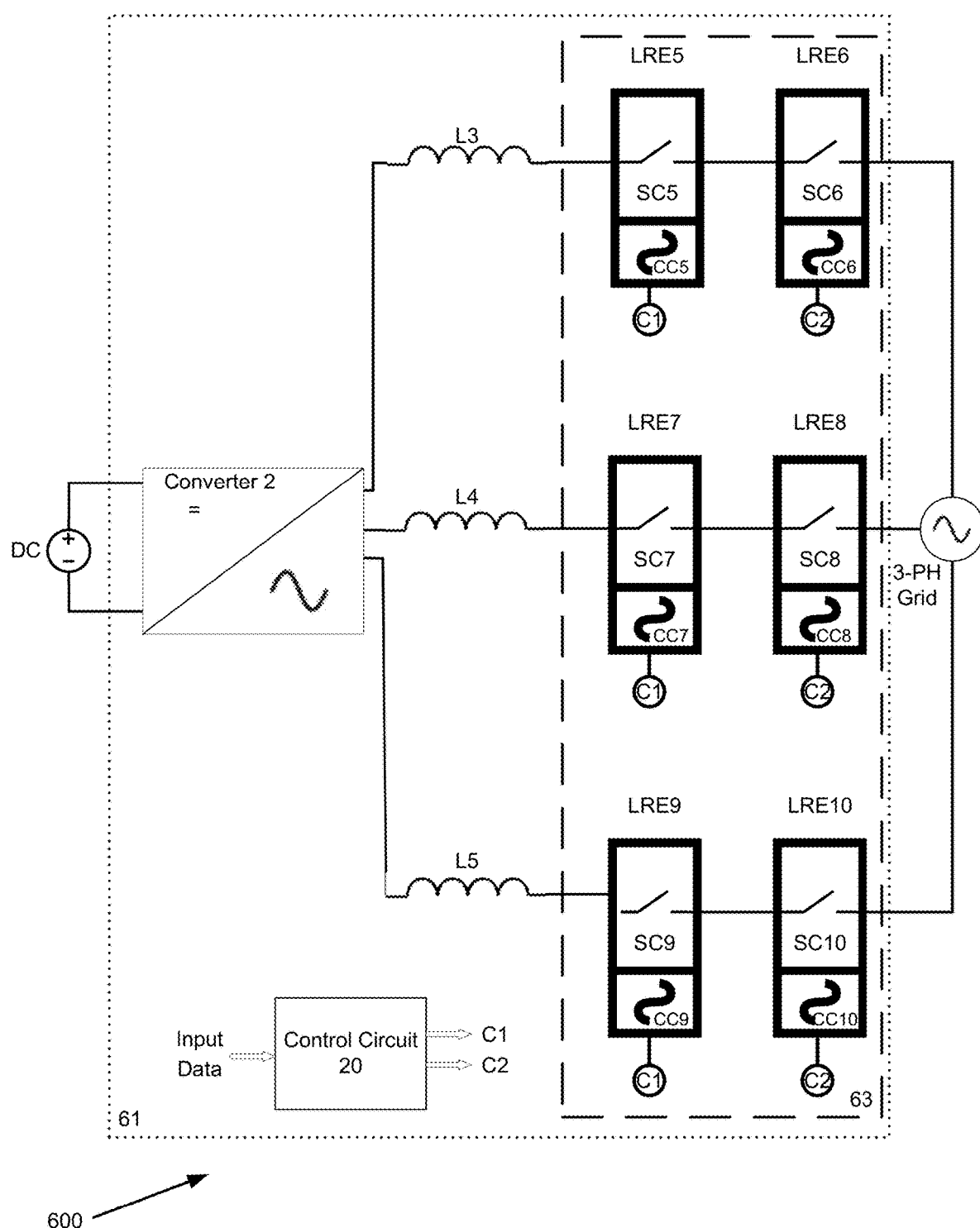
FIG. 6 illustrates a diagram of an electrical circuit according to aspects of the disclosure.

Reference is now made to FIG. 6, which illustrates a diagram of an electrical system 600, an example of system 200 of FIG. 2, according to aspects of the disclosure. According to some aspects, each relay leg may comprise at least two latching relays. For example, in FIG. 6, relays RE5-RE10 of FIG. 2 are implemented with latching relays LRE5-LRE10 respectively, which comprise switching contacts SC5-SC10 respectively and control coils CC5-CC10 respectively.

According to some aspects, relay array 63 may be controlled by only two control signals generated by the control circuit. For example, latching relays LRE5, LRE7 and LRE9 may be controlled by a first common control signal C1 generated by control circuit 20 and latching relays LRE6, LRE8 and LRE10 may be controlled by a second common control signal C2.

According to some aspects, the relay array 63 may be controlled by a separate control signal, generated by the control circuit, for each of the latching relays. For example, each latching relays LRE5, LRE7, LRE9, LRE6, LRE8 and LRE10 may be controlled by a different control signal generated by control circuit 20.

According to some aspects, a plurality of relays of different relay legs/paths (e.g., the first relay leg, second relay leg and third relay leg) of the relay array may be implemented with a multi-pole relay module. For example, latching relays LRE5, LRE7 and LRE9 may share a common control coil. Using a multi-pole relay module may provide benefits of reduced size of electrical system 600, reduced dissipated energy during operation of electrical system 600, and reduced manufacturing costs.

According to some aspects, latching relays LRE5-LRE10 may be incorporated into a single module having one or more control coils. The digital logic of control circuit 20 may be used to generate control signals C1-C2.

In this example, DC-AC converter 2, inductive elements L3-L5, control circuit 20 and relay array 63 comprising latching relays LRE5-LRE10 may be collectively referred to as inverter circuit 61.

Figure 7:
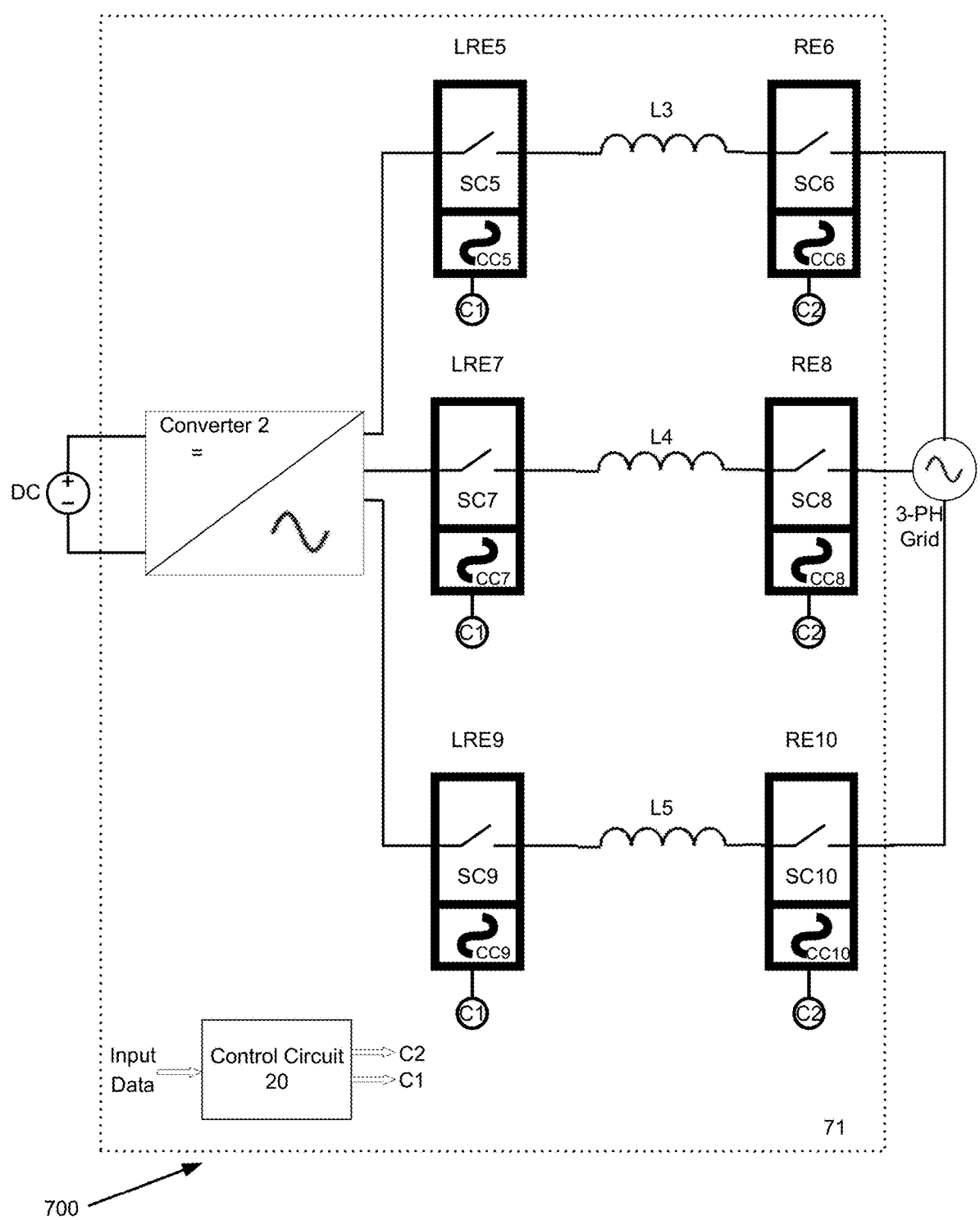
FIG. 7 illustrates a diagram of an electrical circuit according to aspects of the disclosure.

Reference is now made to FIG. 7, which illustrates a diagram of an electrical system 700, an example of system 200 of FIG. 2, according to aspects of the disclosure. According to some aspects, at least one single relay in each relay leg of the relay array may be a latching relay. For example, in FIG. 7, relays RE5, RE7, and RE9 of FIG. 2 are implemented with latching relays LRE5, LRE7, and LRE9 respectively, which comprise switching contacts SC5, SC7, and SC9 respectively and control coils CC5, CC7, and CC9 respectively. Relays RE6, RE8, and RE10 may be single pole relays.

According to some aspects, the relay array may be controlled by only two control signals generated by the control circuit. For example, in the FIG. 7 example, latching relays LRE5, LRE7, and LRE9 may be controlled by a first common control signal C1 generated by control circuit 20 and relays RE6, RE8, and RE10 may be controlled by a second common control signal C2.

According to some aspects, a plurality of relays (two or more) of different relay legs (e.g., first relay leg, second relay leg, and third relay leg) of the relay array may be implemented with a multi-pole relay module. For example, latching relays LRE5, LRE7, and LRE9 may share a common control coil. Using a multi-pole relay module may provide benefits of reduced size of electrical system 700, reduced dissipated energy during operation of electrical system, 700 and reduced manufacturing costs.

In this example, DC-AC converter 2, inductive elements L3-L5, control circuit 20 and a relay array comprising latching relays LRE5, LRE7, and LRE9 and relays RE6, RE8, and RE10 may be collectively referred to as inverter circuit 71.

Figure 8:
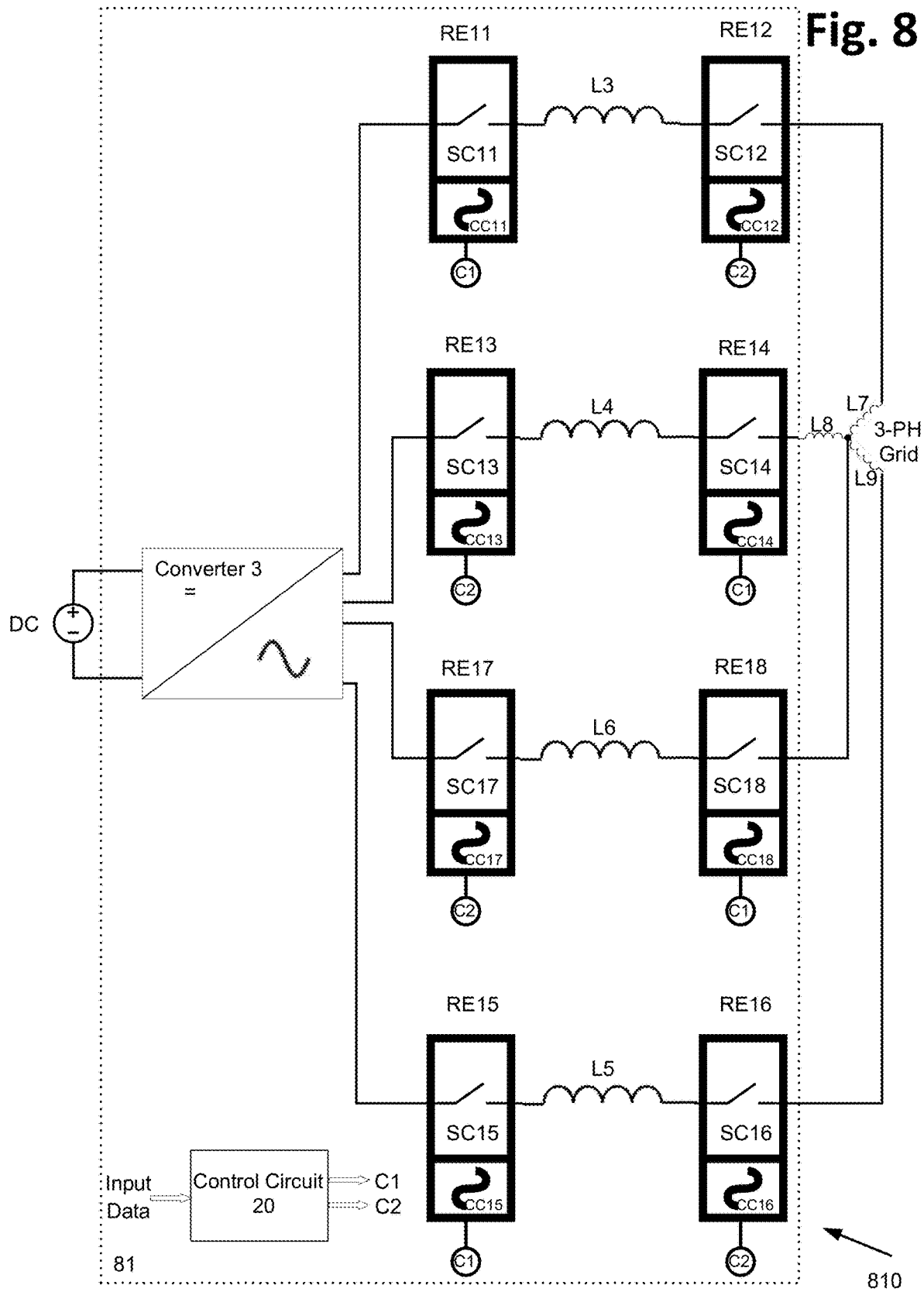
FIG. 8 illustrates a diagram of an electrical circuit according to aspects of the disclosure.

Reference is now made to FIG. 8, which illustrates a diagram of an electrical system 810 according to aspects of the disclosure.

In this instance, DC-AC converter 3, inductive elements L3-L6, control circuit 20 and a relay array comprising relays RE11-RE18 (each comprising a corresponding switching contact SC11-SC18 and a control coil CC11-CC18 respectively) may be collectively referred to as inverter circuit 81. The input terminals of inverter circuit 81 may be coupled across a DC power source (e.g., a photovoltaic [PV] solar panel, PV module, PV array/string, a DC-DC converter), and the output terminals of inverter circuit 81 may be coupled with a three-phase grid comprising phases L7, L8, and L9.

The relay array comprising one or more relay legs may connect DC-AC converter 3 to the three-phase grid. The current path comprising relays RE11-RE12 may be collectively referred to as a first relay leg. The current path comprising relays RE13-RE14 may be collectively referred to as a second relay leg. The current path comprising relays RE15-RE16 may be collectively referred to as a third relay leg. Each of the first relay leg, the second relay leg and the third relay leg may connect between an output terminal of converter 2 to a corresponding grid connection terminal (e.g., phases L7, L8 and L9).

According to some aspects, an electrical circuit (e.g., inverter) connected to a three phase grid may comprise a neutral leg, which may connect an output terminal of the electrical circuit to a neutral point of the grid (e.g., to a neutral conductor connected to a common point of a wye configuration shown in FIG. 8).

For example, in FIG. 8 inverter 81 may comprise a neutral leg comprising relays RE17-RE18 and inductive elements L6, which may connect between an output terminal of DC-AC converter 3 to a neutral point of the three-phase grid.

According to some aspects, the relay array may be controlled by only two control signals generated by the control circuit. For example, in this instance, relays RE11, RE14, RE15, and RE18 may be controlled by a first common control signal C1 generated by control circuit 20 and relays RE12, RE13, RE16, and RE17 may be controlled by a second common control signal C2.

According to some aspects, each relay of the relay array may be controlled by a different control signal generated by the control circuit. For example, each one of the relays RE11-RE18 may be controlled by a corresponding control signal generated by control circuit.

According to some aspects, a plurality of relays (two or more) of different relay legs (e.g., first relay leg, second relay leg, third relay leg, and neutral leg) of the relay array may be implemented with a multi-pole relay module. For example, relays RE11, RE14, RE15, and RE18 may share a first common control coil and relays RE12, RE13, RE16, and RE17 may share a second common control coil. Using a multi-pole relay module may provide benefits of reduced size of electrical system 810, reduced dissipated energy during operation of electrical system 810, and reduced manufacturing costs.

According to some aspects, at least one of the relays RE11-RE18 of the relay array may be a latching relay. Using a latching relay may provide benefits of reduced size of electrical system 810, reduced dissipated energy during operation of electrical system 810, and reduced manufacturing costs.

Figure 9:
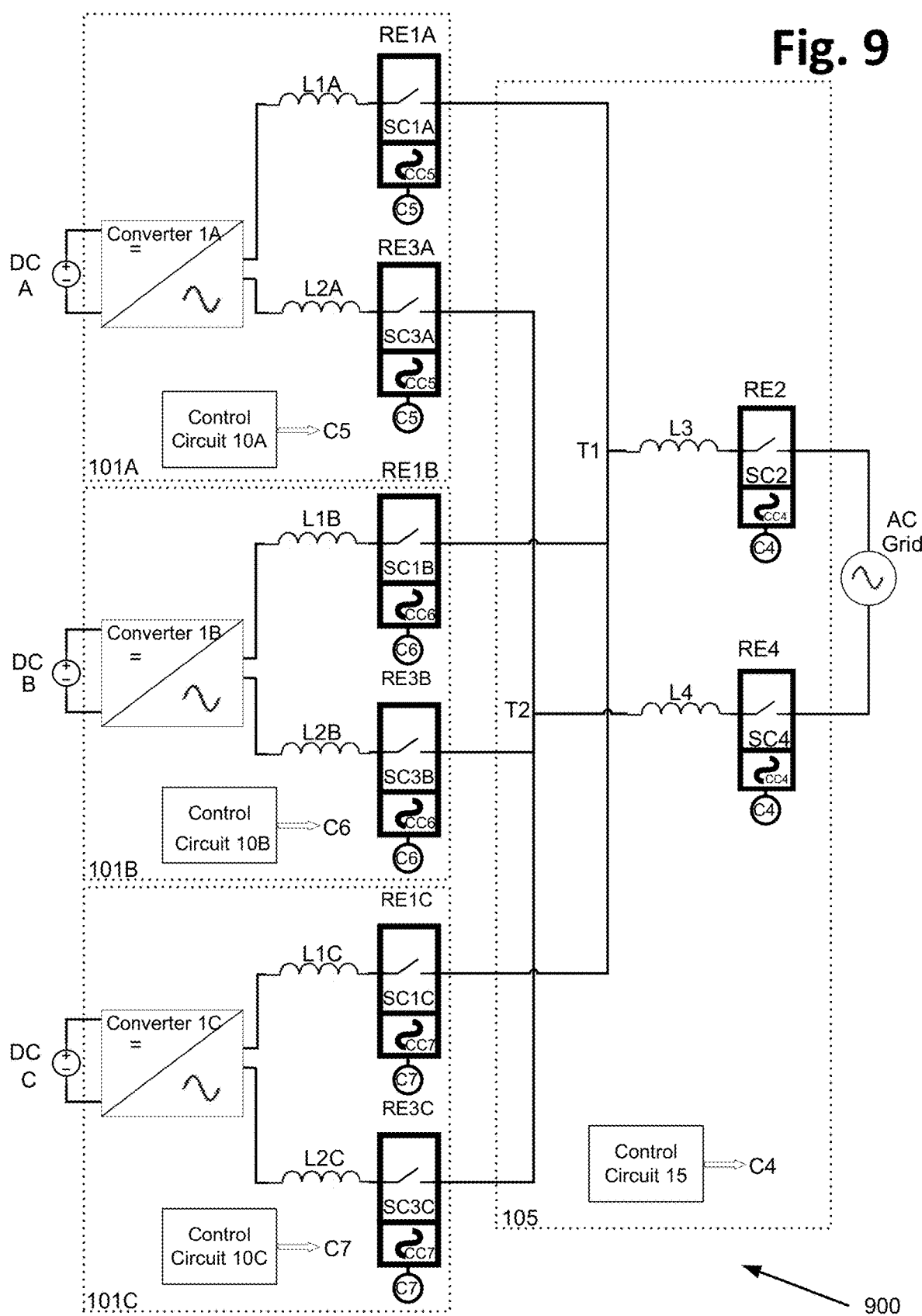
FIG. 9 illustrates a diagram of an electrical circuit according to aspects of the disclosure.

Reference is now made to FIG. 9, which illustrates a diagram of an electrical system 900 according to aspects of the disclosure.

In aspects of the disclosure herein, a connection box including one or more relay legs may connect a plurality of electrical circuits (e.g., inverters) to a grid. Each relay leg may comprise one or more relays and/or relay contacts. The use of such a connection box may enable reducing the number of relay contacts in each of the electrical circuits (e.g., inverters). For example, a circuit having five three-phase inverters coupled with a connection box may comprise a total of 18 relay contacts—one relay for each phase in each inverter (15 relays) and one relay for each phase in the connection box (three relays). If each inverter were to be compliant with a grid code requiring two contacts between each phase output of the inverter and the grid, without a connection box, the circuit would have 30 relays, two relays for each phase in each inverter.

According to some aspects, the use of a connection box may also reduce the number of control signals that control the relays. Referring to the example above, a circuit having five three-phase inverters coupled with a connection box may comprise 18 relay contacts controlled by six control signals—each inverter having a common control signal that controls all three relay contacts in that inverter (five control signals) and one control signal that controls all three relay contacts in the connection box. Without a connection box, the circuit may feature at least ten control signals—at least two control signals for each inverter—to comply with grid codes/standards requiring the two contacts for each phase to be independent controlled.

A connection box may provide, according to some features, additional benefits of reduced power consumption and reduced manufacturing costs. According to some aspects, the connection box may include additional circuits providing more features, for example, a potential-induced degradation (PID) reversal circuit, power supply, communication circuits (e.g., RS-485 communication circuit, power-line communication circuit, Wi-Fi communication circuit, Zigbee communication circuit), gate/coil driver circuits, controller (e.g., digital signal processor), etc. The communication circuit may be used to implement a maximum power point tracking (MPPT) algorithm to keep a PV system operating at, or close to, the peak power point of a PV panel under varying conditions, like changing solar irradiance, temperature, etc.

According to some aspects, a connection box comprising a first relay leg and a second relay leg may connect a plurality of electrical circuits (e.g., inverters) to a single-phase grid or one phase of a multiphase grid. The use of a connection box may reduce the number of relays required in a system and reduce the number of control signals, providing benefits of reduced power consumption and reduced manufacturing costs.

For example, three single-phase inverters 101A, 101B, and 101C may be coupled to connection box 105. The input terminals of each single-phase inverter 101 (e.g., 101A, 101B, and 101C) may be coupled across a DC power source (e.g., DC A, DC B, and DC C), and the output terminals of each single-phase inverter (e.g., 101A, 101B, and 101C) may be coupled to connection box 105.

Each single-phase inverter (e.g., 101A, 101B, and 101C) may comprise a DC-AC converter 1A/1B/1C, a control circuit 10A/10B/10C, inductive elements L1-L2 (e.g., L1A-L2A, L1B-L2B, L1C-L2C—a filter inductor, a differential inductor, a common-mode-choke inductor) and a relay array comprising relays RE1 and RE3, each relay comprising a switching contact (e.g., RE1A and RE3A, RE1B and RE3B, and RE1C and RE3C having SC1A and SC3A, SC1B and SC3B, and SC1C and SC3C, respectively). Each single-phase inverter 101 (e.g., 101A, 101B, and 101C) may comprise a first relay leg and a second relay leg connecting output terminals of a DC-AC converter 1 (e.g., converter 1A, converter 1B and converter 1C) to input terminals of connection box 105. The first relay leg may comprise a first relay (e.g. RE1A, RE1B, RE1C) and a first inductive element (e.g., L1A, L1B, L1C) and the second relay leg may comprise a second relay (e.g., RE3A, RE3B, RE3C) and a second inductive element (e.g., L2A, L2B, L2C).

First switching contact SC1 and second switching contact SC3 of each single-phase inverter 101 may be controlled by a common control coil (e.g., elements denoted CC5 in the figure may be the same element, elements denoted CC6 in the figure may be the same element and elements denoted CC7 in the figure may be the same element) driven by a single control signal (e.g., C5, C6 and C7 respectively) generated by a corresponding control circuit 10A/10B/10C.

According to some aspects, first switching contact SC1 and second switching contact SC3 of each single-phase inverter 101A/101B/101C may be controlled by different control coils driven by different control signals.

Connection box 105 may comprise control circuit 15, a first connection terminal T1 (e.g., line) connecting the first relay legs of each single-phase inverter 101A/101B/101C, and a second connection terminal T2 (e.g., neutral) connecting the second relay legs of each single-phase inverter 101A/101B/101C.

Connection box 105 may further comprise a first relay leg and a second relay leg. The first relay leg may connect between first connection terminal T1 to a first grid-connection of the single-phase grid or one phase of a multiphase grid (e.g., line/neutral). The second relay leg may connect between second connection terminal T2 to a second grid-connection of the single-phase grid or one phase of a multiphase grid (e.g., line/neutral). Each of the first relay leg and the second relay leg may comprise one or more relays (e.g., RE2 and RE4 respectively) having switching contacts (e.g., SC2 and SC4 respectively) and inductive elements (e.g., L3 and L4 respectively).

Switching contact SC2 and switching contact SC4 of connection box 105 may be controlled and coupled with a common control coil (e.g., elements denoted CC4 in the figure may be the same element) driven by a single control signal (e.g., C4) generated by control circuit 15.

According to some aspects, each of switching contact SC2 and switching contact SC4 of connection box 105 may be controlled and coupled with a different control coil driven by a different control signal.

According to some aspects, connection box 105 may be a standalone box (e.g., an intermediate box separate from, but located at the same premises as, inverters 101A/101B/101C) or incorporated into an electrical circuit, for example into one of single-phase inverters 101A/101B/101C or into a different inverter (not shown). In some examples, the inverters 101A/101B/101C may be located close to their respective DC power source (e.g., to reduce power loss), whereas the connection box 105 may be positioned in a more convenient location.

According to some aspects, connection box 105 may comprise two or more relays in each of the first relay leg and the second relay leg. For example, in addition to relays RE2 and RE4, the first relay leg and the second relay leg may comprise a third and a fourth relay respectively, such that connection box 105 may comprise in total four relays (i.e., two relays for phase/line and two relays for neutral). In such case, inverters 101A/101B/101C might not comprise relays and control circuits 10A/10B/10C of inverters 101A/101B/101C and control circuit 15 of connection box 105 may share control logic or communicate with each other to support proper operation of electrical system 900 (e.g., synchronization of waking up processes, power generation timing, etc.).

Inductive elements L1A, L2A, L1B, L2B, L1C, L2C, L3 and L4 may comprise inductance values of various inductive elements coupled across the relay legs, for example, a filter inductor, differential inductor, common-mode-choke inductor, etc. The various inductive elements represented in L1A, L2A, L1B, L2B, L1C, L2C, L3, and L4 may be coupled with different elements along the relay leg. According to some aspects, inductive elements L1A, L2A, L1B, L2B, L1C, L2C, L3, and L4 may be coupled: (i) between an output terminal of converter 1A/1B/1C and a first switching contact (e.g., relay RE1A/B/C, relay RE3A/B/C), or (ii) between a first switching contact and an output terminal of single-phase inverters 101A/101B/101C. According to some aspects, inductive elements L1A, L2A, L1B, L2B, L1C, L2C, L3, and L4 may be coupled: (i) between first connection terminal T1 or second connection terminal T2 and switching contact SC2 or switching contact SC4, respectively, or (ii) between switching contact SC2 or switching contact SC4 and a connection to the (e.g., single-phase) AC grid.

According to some aspects, a plurality of relays (two or more) of different relay legs of the relay array may be implemented with a multi-pole relay module. For example, relays RE1A/RE1B/RE1C and RE3A/RE3B/RE3C may be incorporated into a first dual-pole relay module sharing a first common control coil, and relays RE2 and RE4 may be incorporated into a second dual-pole relay module sharing a second common control coil. Using a dual-pole relay module may provide benefits of reduced size of single-phase inverters 101A/101B/101C and connection box 105, reduced dissipated energy during operation, and reduced manufacturing costs.

According to some aspects, at least one of the relays RE1A/RE1B/RE1C, RE3A/RE3B/RE3C, RE2, and RE4 of the relay array may be a latching relay. Using a latching relay may provide benefits of reduced size of single-phase inverters 101A/101B/101C and connection box 105, reduced dissipated energy during operation, and reduced manufacturing costs.

According to some aspects, electrical system 900 may comprise one or more control circuits. For example, one of single-phase inverters 101A/101B/101C or connection box 105 may comprise a control circuit similar to control circuit 10 of FIG. 1.

According to some aspects, connection box 105 may comprise additional circuits providing more features, for example potential-induced degradation (PID) circuit, power supply, communication circuits (e.g., RS-485 communication circuit, power-line communication circuit, Wi-Fi communication circuit, Zigbee communication circuit), gate/coil driver circuit, controller (e.g., digital signal processor), current/voltage sensors, etc. The communication circuit may be used to implement a maximum power point tracking (MPPT) algorithm to keep a PV system operating at, or close to, the peak power point of a PV panel under varying conditions, like changing solar irradiance, temperature, etc.

According to some aspects, control circuit 15 may communicate (e.g., send/receive data) with control circuits 10A/10B/10C through communication circuits (e.g., RS-485 communication circuit, power-line communication circuit, Wi-Fi communication circuit, Zigbee communication circuit). For example, control circuit may send control circuits 10A/10B/10C a command (e.g., PLC signal) to connect/disconnect the relays, one or more electrical parameters (e.g., voltage, current) of the AC grid. In another example, one of control circuits 10A/10B/10C may send control circuit 15 a signal indicating that the corresponding DC power source is malfunctioning, not generating power, etc.

Figure 10:
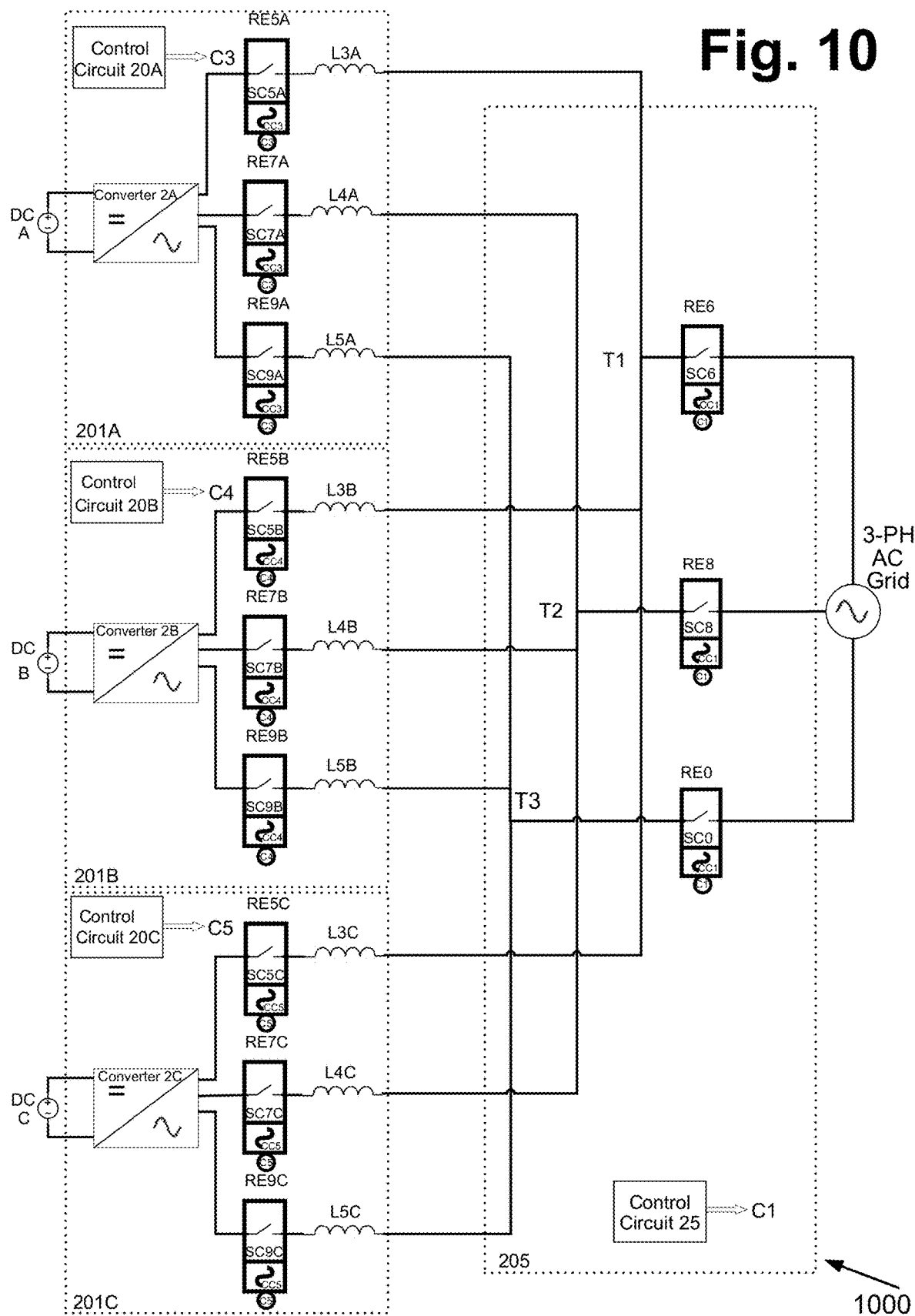
FIG. 10 illustrates a diagram of an electrical circuit according to aspects of the disclosure.

Reference is now made to FIG. 10, which illustrates a diagram of an electrical system 1000 according to aspects of the disclosure.

According to some aspects, a connection box 205 may comprise a first relay leg, a second relay leg, and a third relay leg that may connect a plurality of electrical circuits (e.g., inverters) to a three-phase grid. The use of such a connection box may reduce the number of relays required in a system and reduce a number of control signals, thereby providing benefits of reduced power consumption and reduced manufacturing costs.

For example, in this instance, three three-phase inverters 201A/201B/201C may be coupled with connection box 205. The input terminals of each three-phase inverters 201A/201B/201C may be coupled across a DC power source (e.g., photovoltaic [PV] solar panel, PV module, PV array/string, a DC-DC converter), and the output terminals of each of the three-phase inverters 201A/201B/201C may be coupled with connection box 205.

Each of the three-phase inverters 201A/201B/201C may comprise a DC-AC converter 2A/2B/2C, control circuit 20A/20B/20C, inductive elements L3A-L5A/L3B-L5B/L3C-L5C (e.g., a filter inductor, a differential inductor, a common-mode-choke inductor), and a relay array. The relay array for inverter 201A may comprise relays RE5A, RE7A, and RE9A. The relay array for inverter 201B may comprise relays RE5B, RE7B, and RE9B. The relay array for inverter 201C may comprise RE5C, RE7C, and RE9C. Each of these relays comprises at least one switching contact SC5A, SC7A, SC9A, SC5B, SC7B, SC9B, SC5C, SC7C, and SC9C. Each of the three-phase inverters 201A/201B/201C may comprise a first relay leg, a second relay leg, and a third relay leg connecting between output terminals of DC-AC converter 2A/2B/2C to input terminals of connection box 205. The first relay leg may comprise a first relay (e.g. RE5A/RE5B/RE5C) and a first inductive element (e.g., L3A/L3B/L3C), the second relay leg may comprise a second relay (e.g. RE7A/RE7B/RE7C) and a second inductive element (e.g., L4A/L4B/L4C), and the third relay leg may comprise a third relay (e.g. RE9A/RE9B/RE9C) and a third inductive element (e.g., L5A/L5B/L5C).

First switching contact SC5A/SC5B/SC5C, second switching contact SC7A/SC7B/SC7C and third switching contact SC9A/SC9B/SC9C of each of the three-phase inverters 201A/201B/201C may be controlled and coupled with a common control coil (e.g., elements denoted CC3 in the figure may be the same element, elements denoted CC4 in the figure may be the same, and elements denoted CC5 in the figure may be the same element) driven by a single control signal (e.g., C3, C4 and C5 respectively) generated by a corresponding control circuit 20A/20B/20C.

According to some aspects, first switching contact SC5A/SC5B/SC5C, second switching contact SC7A/SC7B/SC7C, and third switching contact SC9A/SC9B/SC9C of each of the three-phase inverters 201A/201B/201C may be controlled and coupled with a different control coil driven by a different control signal.

Connection box 205 may comprise control circuit 25, a first connection terminal T1 connecting the first relay legs of each three-phase inverter 201A/201B/201, a second connection terminal T2 connecting the second relay legs of each three-phase inverter 201A/201B/201C, and a third connection terminal T3 connecting the third relay legs of each three-phase inverter 201A/201B/201.

Connection box 205 may further comprise a first relay leg, a second relay leg, and a third relay leg. The first relay leg may connect between first connection terminal T1 to a first grid-connection of the three-phase grid. The second relay leg may connect between second connection terminal T2 to a second grid-connection of the three-phase grid. The third relay leg may connect between third connection terminal T3 to a second grid-connection of the three-phase grid. Each of the first relay leg, the second relay leg, and the third relay leg may comprise one or more relays (e.g., RE6, RE8, and RE0 respectively) having switching contacts (e.g., SC6, SC8, and SC0 respectively). According to some aspects, each of the first relay leg, the second relay leg, and the third relay leg may comprise inductive elements, such as a filter inductor, a differential inductor, or a common-mode-choke inductor.

Switching contact SC6, switching contact SC8, and switching contact SC0 of connection box 205 may be controlled and coupled with a common control coil (e.g., elements denoted CC1 in the figure may be the same element) driven by a single control signal (e.g., C1) generated by control circuit 25.

According to some aspects, each of switching contact SC6, switching contact SC8, and switching contact SC0 of connection box 205 may be controlled and coupled with a different control coil driven by a different control signal.

According to some aspects, connection box 205 may be a standalone box (e.g., an intermediate box separate from, but located at the same premises as, inverters 201A/201B/201C) or incorporated into an electrical circuit, for example into one of three-phase inverters 201A/201B/201C or into a different inverter (not shown).

According to some aspects, connection box 205 may comprise additional circuits providing more features, such as, for example, a potential-induced degradation (PID) circuit, a power supply, communication circuits (e.g., RS-485 communication circuit, power-line communication circuit, Wi-Fi communication circuit, Zigbee communication circuit), a gate/coil driver circuit, a controller (e.g., digital signal processor), a current/voltage sensor, a DC switch, a DCD (configured to switch off in the event of a drop out or a failure of one or more components of circuit 1000), an AC switch, etc.

According to some aspects, connection box 205 may comprise a protection circuit, such as a surge protector detection circuit (or device) designed to detect and protect electrical devices from voltage spikes, an overheating detection circuit comprising thermistors (e.g., coupled to the power lines), fuse(s), etc.

According to some aspects, connection box 205 may comprise a pre-commissioning circuit, configured to ensure that electrical system 1000 is safe and performing as per its specifications prior to connecting electrical system 1000 to the AC three-phase grid. The connection box may comprise an inner/outer connection to a power bank circuit, configured to provide power for pre-commissioning tests (for example, relay test, isolation test, mapping, etc.). The power bank circuit may provide safe DC power to the pre-commissioning circuit, such that with/without a connection to the AC grid the pre-commissioning tests may be performed. The pre-commissioning circuit may be an important feature especially for large photovoltaic systems where a connection to the AC grid may require a significant time.

Inductive elements L3-L5 (e.g., L3A, L3B, L3C, L4A, L4B, L4C, L5A, L5B, and L5C) may comprise inductance values of various inductive elements coupled across the relay legs, such as, for example, a filter inductor, differential inductor, common-mode-choke inductor, etc. The various inductive elements represented in L3-L5 may be coupled with different elements along the relay leg. According to some aspects, inductive elements L3-L5 may be coupled between an output terminal of converter 2 and a first switching contact (e.g., relay RE5A/RE5B/RE5C, relay RE7A/RE7B/RE7C, relay RE9A/RE9B/RE9C), or between a first switching contact and an output terminal of three-phase inverters 201A/201B/201C.

According to some aspects, a plurality of relays (two or more) of different relay legs of the relay array may be implemented with a multi-pole relay module. For example, relay RE5A, relay RE7A and relay RE9A may be incorporated into a first three-pole relay module sharing a first common control coil, and relays RE6, RE8 and RE0 may be incorporated into a second three-pole relay module sharing a second common control coil. Using a multi-pole relay module may provide benefits of reduced size of three-phase inverters 201A/201B/201C and connection box 205, reduced dissipated energy during operation, and reduced manufacturing costs.

According to some aspects, at least one of the relays RE5-RE9 and RE0 of the relay array may be a latching relay. Using a latching relay may provide benefits of reduced size of three-phase inverters 201 and connection box 205, reduced dissipated energy during operation, and reduced manufacturing costs.

According to some aspects, electrical system 1000 may comprise one or more control circuits. For example, one of three-phase inverters 201 or connection box 205 may comprise a control circuit similar to control circuit 20 of FIG. 2.

According to some aspects, a relay leg of connection box 205 may comprise three different relay legs of three-phase inverters 201. For example, a relay leg of connection box 205 may comprise a first relay leg of a first inverter 201, a second relay leg of a second inverter 201, and a third relay leg of a third inverter 201.

According to some aspects, control circuit 25 may communicate (e.g., send/receive data) with control circuits 20A/20B/20C through communication circuits (e.g., RS-485 communication circuit, power-line communication circuit, Wi-Fi communication circuit, Zigbee communication circuit). For example, control circuit may send control circuits 20A/20B/20C a command (e.g., PLC signal) to connect/disconnect the relays, one or more electrical parameters (e.g., voltage, current) of the AC grid. In another example, one of control circuits 20A/20B/20C may send control circuit 25 a signal indicating that the corresponding DC power source is malfunctioning, not generating power, etc.

According to some aspects, connection box 205 may comprise two or more relays in each of the first relay leg and the second relay leg. For example, in addition to relays RE6, RE8, and RE0, the first, second, and third relay leg may comprise a fourth, a fifth, and a sixth relay respectively, such that connection box 205 may comprise in total six relays (i.e., two relays for each phase). In such case, inverters 201A/201B/201C might not comprise relays and control circuits 20A/20B/20C of inverters 201A/201B/201C and control circuit 25 of connection box 205 may share control logic or communicate with each other to support proper operation of electrical system 1000 (e.g., synchronization of waking up processes, power generation timing, etc.).

Figure 11A:
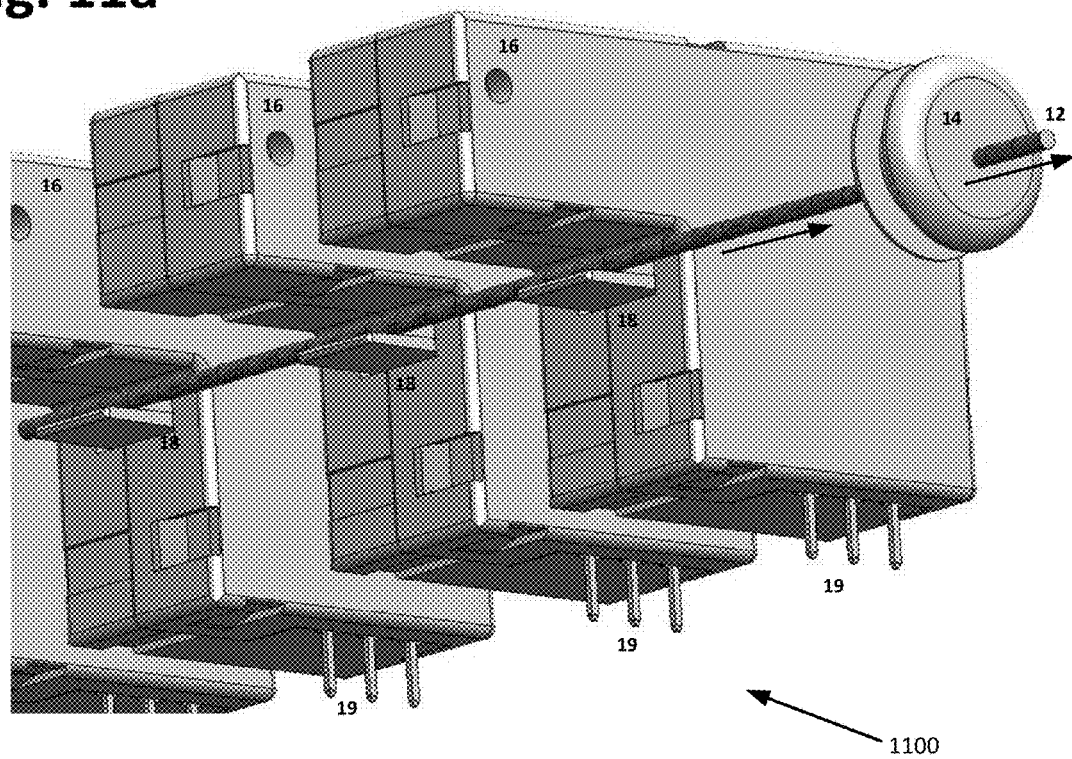
FIG. 11a illustrates a perspective view of a system according to aspects of the disclosure.

Reference is now made to FIG. 11*a*, which illustrates a relay array (or part thereof) with a safety catch (e.g., a pin, a toggle, an electronic safety pin).

In aspects of the disclosure herein, the relay array may comprise a safety catch, such as a disconnect lock pin, designed to prevent the latching relay from premature conduction. For example, the safety catch may prevent the latching relay from turning ON before a suitable time to begin feeding power from the device to the grid or from the grid to the device. The safety catch may prevent the electromechanical mechanism that controls the switching contact from making a connection of the switching contact, thereby ensuring that before and during the installation of the electrical device comprising the relay array to the grid, no current flows from the circuit to the grid, or vice versa. In contrast to electromagnetic relays that are in a known ON or OFF state depending on whether the coil is activated or not, latching relays may toggle/change between ON/OFF states in response to power pulses and include a mechanical latch that can change states due to mechanical forces, such as vibrations and contact with other objects that may occur during transportation of the system to the installation site. Therefore, the safety catch may ensure that an initial state of a latching relay is the OFF state. Without the safety catch, an installer of a system using latching relays might have to take additional steps to make sure the latching relays are initially set to the OFF state, which may result in higher costs of installation and reduced reliability due to human error in installing the system. Thus, the safety catch may make it practical to use latching relays in the electrical device (e.g., inverter). The safety catch may comprise a mechanical or an electrical mechanism (e.g., lever, magnet, handle) that may enable a removal of the safety catch. A removal of the safety catch may enable, with an occurrence of a power pulse, a connection of the switching contact. After the installation is completed, the safety catch may be removed by the installer, to enable turning the relay contacts ON and connecting the circuit to the grid.

In FIG. 11*a*, relay array 1100 comprising a plurality of latching relays 16 may be incorporated into an electrical system (e.g., an inverter). Each latching relay 16 may comprise an electromechanical switching contact 18 and control pins 19. The control pins 19 may be connected through control signal transmission lines/conductors to a component that may generate or transmit control signals (e.g., controller, digital signal processing [DSP], field programmable gate array [FPGA]). Each latching relay 16 may comprise terminals (not shown in the figure) connected to terminals of the corresponding bus/grid/line.

Each electromechanical switching contact 18 may have two states/positions. A first state/position may be when the upper horizontal surface of switching contact 18 may have a partial or a full contact with the surface of the body of the corresponding latching relay 16. When switching contact 18 is at the first state/position, the switching contact 18 may be connected mechanically and electrically and the corresponding latching relay 16 may conduct. A second state/position may be when the upper horizontal surface of switching contact 18 may have a gap from the surface of the body of the corresponding latching relay 16. When switching contact 18 is at the second state/position, the switching contact 18 may be disconnected mechanically and electrically and the corresponding latching relay 16 may be open-circuited.

Each latching relay 16 may have an electromechanical/electrical/mechanical mechanism (e.g., lever, magnet, handle) that, based on receiving a control signal through corresponding control pins 19, may change the state/position of the corresponding switching contact 18, from the first state/position to the second state/position and vice-versa. In the absence of receiving a control signal, latching relay 16 and the corresponding switching contact 18 may remain at the last state/position (e.g., the first state/position or the second state/position).

According to some aspects, relay array 1100 may be coupled to a safety catch 12. Safety catch 12 may be held fixed by a locking mechanism 14 (e.g., a nut, linchpin, clasp, etc.), which may be coupled with an element of the electrical system or incorporated into the electrical system. In this instance, safety catch 12 may be threaded through an aperture (e.g., micro-aperture) of locking mechanism 14.

Safety catch 12 may be located between the upper horizontal surface of switching contact 18 and the surface of the body of the corresponding latching relay 16, thereby preventing the upper horizontal surface of switching contact 18 from creating a contact with the surface of the body of the corresponding latching relay 16, and enforcing latching relay 16 and the corresponding switching contact 18 to be at the second state/position (e.g., disconnected and open-circuited).

In this instance, locking mechanism 14 may enable a removal of safety catch 12 only by pulling safety catch 12 out in the vertical axis of the surface of locking mechanism 14 (e.g., in the direction that the arrows indicate). When safety catch 12 may be pulled out of the gap between the upper horizontal surface of switching contact 18 and the surface of the body of the corresponding latching relay 16, the electromechanical mechanism of latching relay 18 may be able to, based on receiving a control signal through corresponding control pins 19, change the state of corresponding switching contact 18 to the first state/position.

In some instances, safety catch 12 may be a disposable safety pin, which is designed (e.g., made of plastic, rubber, or a similar cost-effective material, which may be insulating) for a single use after which it is recycled or disposed.

The safety pin of relay array 1100 of FIG. 11a may be incorporated into any of the relay arrays illustrated in FIGS. 1-10.

Figure 11B:
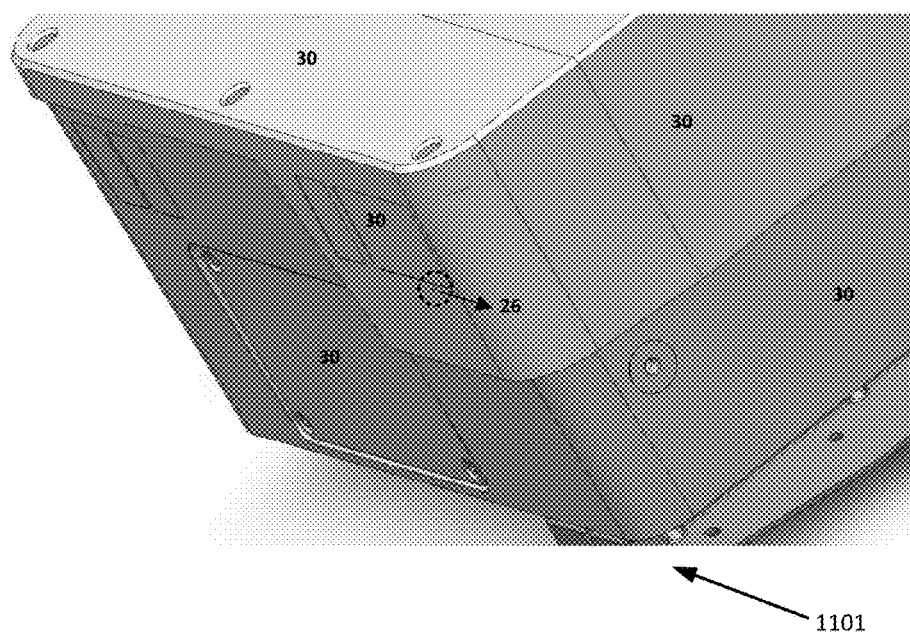
FIG. 11b illustrates a perspective view of a system according to aspects of the disclosure.

Reference is now made to FIG. 11b, which illustrates a safety catch incorporated into an electrical system (e.g., an inverter). As highlighted by the dashed circle in FIG. 11b, safety catch 26 (similar to safety catch 12 of FIG. 11a) may be coupled with casing 30 of inverter 1101. For example, the safety catch 25 may extend from the latching relay(s) inside an inverter through an aperture (e.g., hole, opening, etc.) in the casing 30 to an area outside the inverter. This provides a person (e.g., installer of the inverter) with a means for removing the safety catch 26 conveniently (e.g., without having to remove a lid or casing of the inverter). Safety catch 26 may be held fixed by one or more locking mechanisms (not shown in this figure), such as the example locking mechanism 14 of FIG. 11a that may be incorporated into casing 30. As long as safety catch 26 may be located inside inverter 1101, the latching relays 18 of FIG. 11a may be at the second state/position and not conduct.

In this instance, a removal of safety catch 26 may be possible by pulling safety catch 25 out in the vertical axis of the surface of casing 30. Pulling the safety catch 26 in this manner may be the only practical way (e.g., without damaging the inverter) of removing the safety catch 26. When safety catch 26 may be pulled out of the casing 30, the electromechanical mechanism of latching relays 18 of FIG. 11a may be able to, based on receiving a control signal through corresponding control pins 19 of FIG. 11a, change the state/position of corresponding switching contact 18 of FIG. 11a to the first state/position and to conduct.

Figure 12:
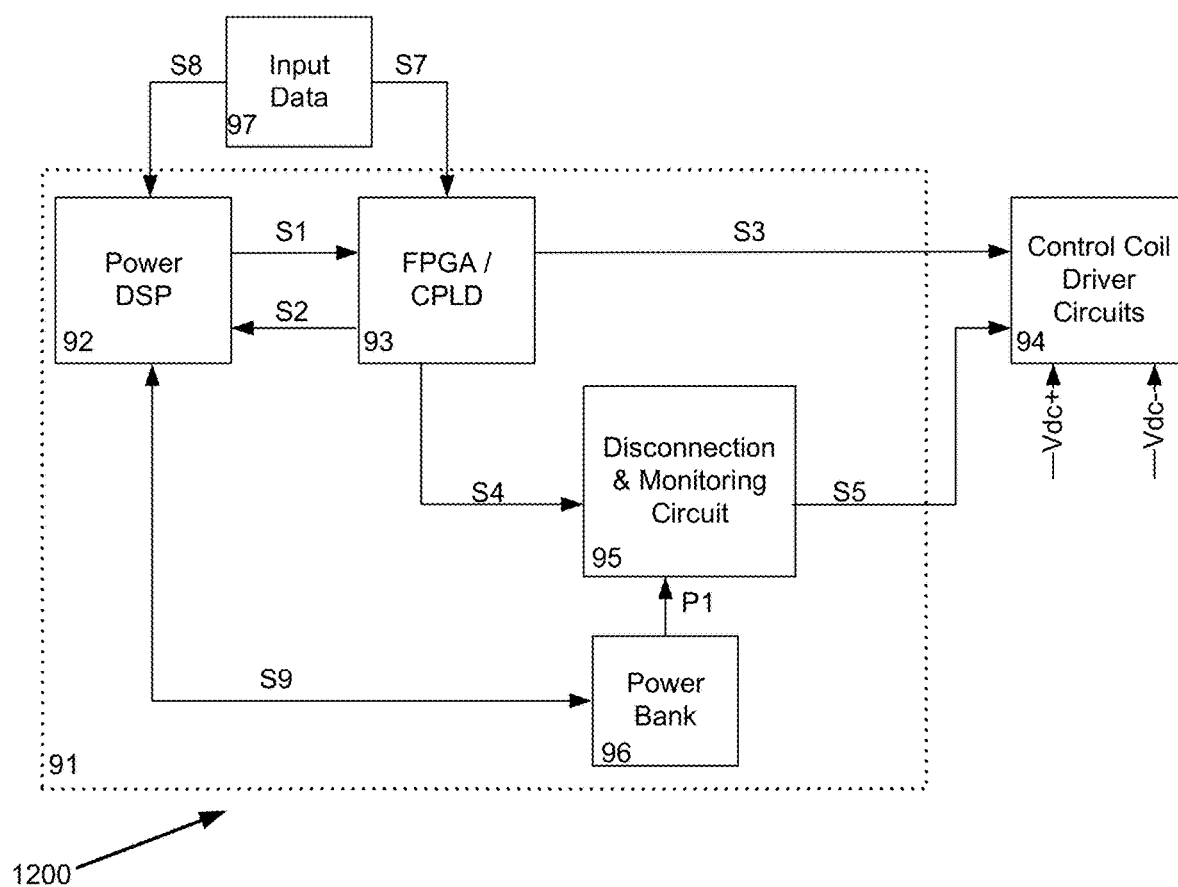
FIG. 12 illustrates a block diagram of an electrical circuit according to aspects of the disclosure.

Reference is now made to FIG. 12, which illustrates a block diagram of a control circuit (or part thereof). In FIG. 12, diagram 1200 comprises control circuit 91 that, based on receiving input data 97, may provide control coil driver circuits 94 with control signals (S3, S5). Based on control signals (S3, S5), control coil driver circuits 94 may drive at least two control coils of latching relays (for example, latching relays LRE1 and LRE3 of FIG. 3 or latching relays LRE5-LRE10 of FIG. 6) to supply the control coils with a power pulse that may generate a magnetic field at the control coil and activate an electromechanical mechanism that may change the switching contact state/position (e.g., conducting/ON or nonconducting/OFF).

Power digital signal processing (DSP) 92, controller (e.g., field-programmable gate array (FPGA)/complex programmable logic device (CPLD) 93/embedded controller, digital logic circuit, etc.), disconnection & monitoring circuit 95, and power bank 96 may be collectively referred to as control circuit 91. Control circuit 91 may be similar to control circuit 10 of FIG. 1 or control circuit 20 of FIG. 2. Control circuit 91 may be incorporated into an electrical device (e.g., inverter), a relay, a connection box, a relay array, etc.

Control coil driver circuits 94 may receive power to drive the corresponding control coil by power supplies Vdc+ and Vdc−.

According to some aspects, based on input data 97 (e.g., a measurement or an estimation of electrical parameters of the electrical circuit, an enable signal, an external command) or a decision made by power DSP 92, control circuit 91 may generate control signal S3 (e.g., connection signal) that may command control coil driver circuits 94 to connect the switching contact(s) of the corresponding latching relay(s) and connect the electrical circuit to the corresponding grid-phase.

According to some aspects, based on input data 97 that may indicate one or more detected interruptions, malfunctions, and trip-zones (e.g., an occurrence of an unsought high voltage or high current) of the electrical circuit or the grid coupled to the electrical circuit, control circuit 91 may generate control signal S5 (e.g., disconnection signal) that may command control coil driver circuits 94 to disconnect the switching contact(s) of the corresponding latching relay(s) and disconnect the electrical circuit from the corresponding grid-phase.

Power DSP 92 may receive signal S8 which includes various types of input data 97 (e.g., current sensing, voltage sensing, temperature sensing). Based on: (i) an analysis; (ii) a programmed algorithm; and/or (iii) dynamic decision making, power DSP 92 may generate control signal 51 to indicate FPGA/CPLD 93 whether to connect, disconnect, or maintain the same states of the latching relays. FPGA/CPLD 93 may receive signal S7 which includes various types of input data 97 (e.g., similar or different than signal S8) and may also have the option to decide on a disconnection from the grid, generally when a hardware failure (e.g., a trip-zone) occurs. In such scenarios, FPGA/CPLD 93 may generate signal S2 to inform power DSP of the disconnection and the cause for the disconnection. In this manner, FPGA/CPLD 93 may also function as a back-up and redundant element for power DSP 92, in case of a malfunction of power DSP 92.

With a decision of connecting the electrical circuit to the grid, FPGA/CPLD 93 may generate a predetermined signal S3 (e.g., a pulse) to indicate control coil driver circuits 94 to drive the control coils of the latching relays and generate a connection of the switching contacts.

FPGA/CPLD 93 may also generate signal S4, thereby providing disconnection & monitoring circuit 95 a timer reset that indicates when to control the control coil driver circuits 94 to disconnect the latching relay. In some examples, signal S4 may be a pulse width modulation (PWM) signal (for example, a signal having a duty-cycle of 50%) except for predetermined scenarios. For example, a scenario wherein FPGA/CPLD 93 may differentiate signal S4 from a PWM signal may be when signal 51 indicates FPGA/CPLD 93 to disconnect the latching relays and the electrical circuit from grid-phase or when FPGA/CPLD 93 makes a decision to disconnect from the grid-phase. For instance, in such a scenario FPGA/CPLD 93 may generate signal S4 as a DC signal.

With an occurrence of signal S4 that may be different than a PWM signal, disconnection & monitoring circuit 95 may generate signal S5 to control the control coil driver circuits 94 to disconnect the latching relays and the electrical circuit from grid-phase.

In some instances, a signal S4 that may be different than a PWM signal may occur when one of the power supplies Vdc+ and Vdc− is out of order or malfunctioning. Therefore, disconnection & monitoring circuit 95 may be coupled with power bank 96 (e.g., energy reservoir), which may store a predetermined amount of energy to drive the control coils. The predetermined amount of energy may be above a threshold, which indicates the minimum energy required to generate a power pulse that may change the state of the switching contact(s) of the latching relay(s). In such cases, power bank 96 may provide disconnection & monitoring circuit 95 with a power pulse P1.

In some instances, control circuit 91 may control and ensure charging of power bank 96 to a level above the threshold. Power bank 96 may be charged from one or more power sources coupled to control system 91 or incorporated into control system 91. A plurality of power sources may provide benefits of redundancy.

In some instances, power DSP 92 may sense or take a measurement of some electrical parameters (e.g., voltage, current, power, temperature) of power bank 96 by sending or receiving signal S9.

A sub-circuit of control circuit 91 or a circuit coupled to control circuit 91 (not shown) may ensure a storage of an amount of energy above the threshold throughout the operation of the circuit.

Disconnection & monitoring circuit 95 may comprise a timing circuit that may control the time interval of generating signal S5. The time interval may be above a minimum time required to drive the control coils.

Monitoring circuit 95 may provide redundancy for scenarios where FPGA/CPLD 93 may be out of order or malfunctioning. For example, in a scenario where FPGA/CPLD 93 may be out of order or malfunctioning, FPGA/CPLD 93 might not generate signal S4 as a PWM signal and in response monitoring circuit 95 may start the control process to disconnect the latching relays.

Figure 13:
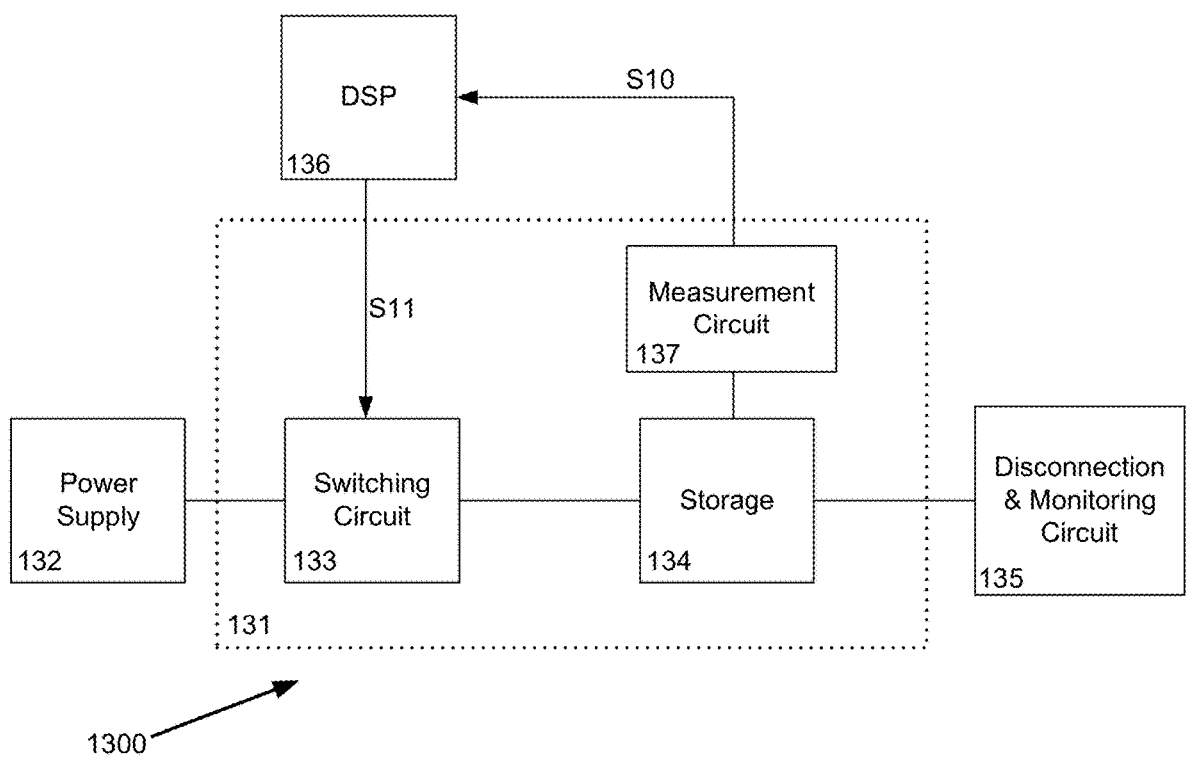
FIG. 13 illustrates a block diagram of an electrical circuit according to aspects of the disclosure.

Reference is now made to FIG. 13, which illustrates a block diagram of a power bank circuit (or part thereof). Power bank 131 (e.g., energy reservoir) may store a predetermined amount of energy to provide a disconnection & monitoring circuit 135 with a power pulse for driving a control coil(s) of a latching relay(s).

The predetermined amount of energy may be above a threshold, which indicates the minimum energy required to generate a power pulse that may generate a magnetic field at the control coil and activate an electromechanical mechanism that may change the switching contact(s) state/position (e.g., conducting/ON or nonconducting/OFF) of the latching relay(s).

Disconnection & monitoring circuit 135 may be similar to disconnection & monitoring circuit 95 of FIG. 12 or a different one. Disconnection & monitoring circuit 135 may be incorporated into an electrical device (e.g., inverter).

DSP 136 may be similar to power DSP 92 of FIG. 12 or a different one. DSP 136 may be incorporated into an electrical device (e.g., inverter).

Switching circuit 133, storage 134 (e.g., capacitor(s), battery), and measurement circuit 137 may be collectively referred to as power bank 131. Power bank 131 may be similar to power bank 96 of FIG. 12. Power bank 131 may be incorporated into an electrical device (e.g., inverter).

Power supply 132 may be a local power supply that is internal or external to the electrical device (e.g., inverter). Power supply 132 (e.g., auxiliary circuit) may provide power bank 131 with a DC voltage. A plurality of power supplies may provide benefits of redundancy.

Based on a decision to connect the electrical circuit to the grid, power supply 132 may provide power to charge storage 134 via switching circuit 133. DSP 136 may generate control signal S11 to control switching circuit 133 to connect or disconnect power supply 132 to storage 134. Switching circuit 133 may, based on receiving signal(s) S11 from power digital signal processing (DSP) 136, conduct or not conduct power to charge or discharge, respectively, storage 134.

In some instances, measurement circuit 137 (e.g., voltage sensor, voltmeter) may sense or take a measurement(s) of one or more electrical parameters (e.g., voltage, current, power, temperature) of storage 134 continuously or intermittently (e.g., periodically) to ensure that storage 134 stores a voltage/power level above the threshold. Measurement circuit 137 may send, to DSP 136, an analog and/or digital signal(s) S10 providing data that indicates the measurement(s) of one or more electrical parameters.

Based on a decision to disconnect the electrical circuit from the grid, DSP 136 might not generate signal S11 (e.g., null voltage) to control switching circuit 133 to interrupt the power provided by power supply 132 to storage 134, thereby causing a discharging of the power stored in storage 134 towards disconnection & monitoring circuit 135 to drive the control coil(s) of the latching relay(s) and generate a disconnection of the switching contacts.

Likewise, storage 134 may also provide disconnection & monitoring circuit 135 with an amount of energy that may be above a threshold (e.g., a predetermined amount of energy), in case of a malfunction of DSP 136 (or other reason that DSP 136 might stop sending signal S11).

Figure 14:
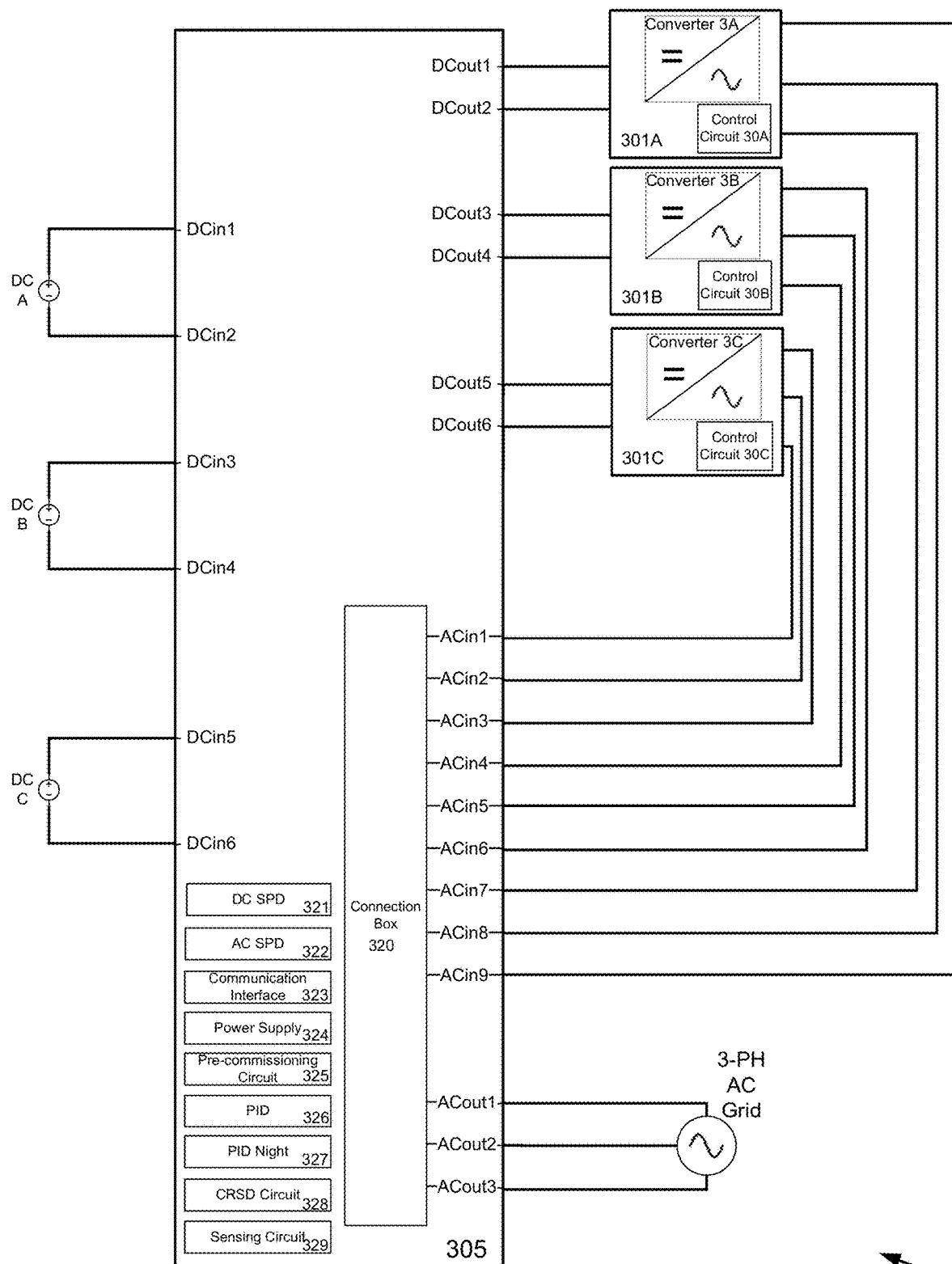
FIG. 14 illustrates a diagram of an electrical circuit according to aspects of the disclosure.

Reference is now made to FIG. 14, which illustrates a diagram of an electrical system 1400 according to aspects of the disclosure.

In aspects of the disclosure herein, an electrical circuit 305 may comprise a connection box 320 (e.g., similar to connection box 205 of FIG. 10a), including one or more relay legs that may connect the output of the electrical circuits (e.g., inverters) to a grid. Each relay leg may comprise one or more relays and/or relay contacts.

Electrical circuit 305 may connect the output of a plurality of DC power sources (e.g., photovoltaic [PV] solar panels, PV modules, PV arrays/strings, DC-DC converters) to the input of the electrical circuits (e.g., inverters). For example, as shown in FIG. 14, electrical circuit 305 may comprise a plurality of input DC terminals DCin1, DCin2, DCin3, DCin4, DCin5, and DCin6. DC power sources DC A, DC B, and DC C may be coupled across a pair of input DC terminals DCin1-DCin2, DCin3-DCin4, and DCin5-DCin6, correspondingly.

Electrical circuit 305 may comprise a plurality of output DC terminals, for example output DC terminals DCout1, DCout2, DCout3, DCout4, DCout5, and DCout6 of FIG. 14. A plurality of inverters (e.g., single-phase inverters, three-phase inverters) may be coupled to each pair of the output DC terminals. For example, three three-phase inverters 301A, 301B, and 301C may be coupled to electrical circuit 305. The input terminals of each three-phase inverter 301 (e.g., 301A, 301B, and 301C) may be coupled across a pair of the output DC terminals DCout1-DCout2, DCout3-DCout4, and DCout5-DCout6, correspondingly. The output terminals of each three-phase inverter 301 (e.g., 301A, 301B, and 301C) may be coupled to electrical circuit 305 through a plurality of input AC terminals of electrical circuit 305, for example input AC terminals ACin1, ACin2, ACin3, ACin4, ACin5, ACin6, ACin7, ACin8 and ACin9.

Each input AC terminal of the plurality of input AC terminals of electrical circuit 305 may be coupled to connection box 320 (optionally through additional circuit elements, such as a series resistor, a switch, an AC surge protection device (SPD), thermistor, sensor, etc.). The output of connection box 320 may be coupled to a plurality of output AC terminals. For example, connection box 320 may be coupled to a plurality of output AC terminals ACout1, ACout2 and ACout3 configured to provide power (e.g. an AC voltage, a sinewave voltage) to the AC grid (e.g., 3-PH AC Grid).

The use of such a connection box 320 may reduce the number of relay contacts in each of the electrical circuits (e.g., inverters). For example, a circuit having five three-phase inverters coupled with a connection box may comprise a total of 6 relay contacts (two relays for each phase in the connection box) or 18 relay contacts (one relay for each phase in each inverter and one relay for each phase in the connection box). If each inverter were to be compliant with a grid code requiring two contacts between each phase output of the inverter and the grid, without a connection box, the circuit would have 30 relays, two relays for each phase in each inverter.

According to some aspects, the use of a connection box may also reduce the number of control signals that control the relays. Referring to the examples above, a circuit having five three-phase inverters coupled with a connection box may comprise 6 relay contacts controlled by three control signals, and a connection box that may comprise 18 relay contacts controlled by six control signals—each inverter having a common control signal that controls all three relay contacts in that inverter (five control signals) and one control signal that controls all three relay contacts in the connection box. Without a connection box, the circuit may feature at least ten control signals—at least two control signals for each inverter—to comply with grid codes/standards requiring the two contacts for each phase to be independently controlled.

An electrical circuit, such as electrical circuit 305, configured to receive DC power from a plurality of DC power sources, provide DC power to a plurality of DC/AC inverters, receive the AC power provided by the plurality of DC/AC inverters and provide AC power to the AC grid, may provide additional benefits of reduced power consumption and reduced manufacturing costs.

According to some aspects, electrical circuit, such as electrical circuit 305, is configured to receive DC power from a plurality of DC power sources, provide DC power to a plurality of DC/AC inverters, receive the AC power provided by the plurality of DC/AC inverters and provide AC power to the AC grid. The electrical circuit may include optional additional circuits providing more features. By virtue of the use of some additional circuits as common circuits for the plurality of DC power sources and/or the plurality of DC/AC inverters, the electrical circuit (e.g., electrical circuit 305) may provide additional benefits of reduced power consumption and reduced manufacturing costs.

For example, according to some aspects, the electrical circuit may comprise a fault or risk detection circuit, such as a surge protector detection circuit (or device) designed to detect and/or protect electrical devices from voltage spikes, an overheating detection circuit comprising thermistors (e.g., coupled to the power lines), fuse(s), etc. For example, electrical circuit 305 may comprise DC surge protection device (SPD) 321 and AC surge protection device (SPD) 322. DC surge protection device (SPD) 321 may be coupled between the plurality of input DC terminals DCin1, DCin2, DCin3, DCin4, DCin5, and DCin6 and the plurality of output DC terminals DCout1, DCout2, DCout3, DCout4, DCout5, and DCout6. AC surge protection device (SPD) 322 may be coupled between the plurality of output AC terminals ACout1, ACout2 and ACout3 and connection box 320, or between connection box 320 and the plurality of input AC terminals ACin1, ACin2, ACin3, ACin4, ACin5, ACin6, ACin7, ACin8 and ACin9. In case of an occurrence of voltage spike, overheating, etc., the DC SPD and/or AC/SPD may detect a fault. Based on the fault detection, a protection circuit (e.g., switch, relay, SPD, etc.) may disconnect electrical circuit 305 from the plurality of DC power sources and/or the plurality of DC/AC inverters, thereby protecting electrical circuit 305. Electrical circuit 305 may comprise protection circuits, such as DC switch, a DCD (configured to switch off in the event of a drop out or a failure of one or more components of circuit 1400), an AC switch, etc.

According to some aspects, the electrical circuit may comprise a common communication interface configured to communicate with the plurality of DC/AC inverters and/or the plurality of DC power sources (e.g., DC-DC converters). For example, connection box 320 may comprise communication interface 323, which may be implemented as a RS-485 communication circuit, power-line communication circuit, Wi-Fi communication circuit, or Zigbee communication circuit. The communication interface may be used to implement a maximum power point tracking (MPPT) algorithm to keep a PV system operating at, or close to, the peak power point of a PV panel under varying conditions, like changing solar irradiance, temperature, etc.

According to some aspects, the electrical circuit may comprise a common potential-induced degradation (PID) circuit for the plurality of DC/AC inverters and/or the plurality of DC power sources (e.g., photovoltaic [PV] solar panels, PV modules, PV arrays/strings). For example, electrical circuit 305 may comprise PID circuit 326 and/or PID night circuit 327. Using a common potential-induced degradation (PID) circuit may provide benefits of reduced size of electrical system 1400, reduced dissipated energy during operation of electrical system 1400, and reduced manufacturing costs.

According to some aspects, electrical circuit 305 may comprise a pre-commissioning circuit 325, configured to ensure that electrical system 1400 is safe and performing as per its specifications prior to connecting electrical system 1400 to the AC three-phase grid. Electrical circuit 305 may comprise an inner/outer connection to a power bank circuit, configured to provide power for pre-commissioning tests (for example, relay test, isolation test, mapping, etc.). The power bank circuit may provide safe DC power to the pre-commissioning circuit 325, such that with/without a connection to the AC grid the pre-commissioning tests may be performed. A centralized pre-commissioning circuit 325 for a plurality of inverters (e.g., single-phase inverters, three-phase inverters), for example three three-phase inverters 301A, 301B, and 301C, may facilitate installation and commissioning process, thereby reducing commissioning and installation costs. The pre-commissioning circuit 325 may be an important feature especially for large photovoltaic systems where a connection to the AC grid may require a significant time.

According to some aspects, electrical circuit 305 may comprise power supply 324. Power supply 324 may be used for initialization of system 1400 (for example, power generation after night time), pre-commissioning tests, power supply for control circuits 30A, 30B and 30 C of converters 3A, 3B and 3C correspondingly, etc.

According to some aspects, electrical circuit 305 may comprise common rapid shut down (CRSD) circuit 328. Common rapid shut down (CRSD) circuit 328 may be configured to discharge an electrical potential that built up due to parasitic capacitance. CRSD circuit 328 may be connected to one or more of the plurality of DC power sources (e.g., photovoltaic [PV] solar panels, PV modules, PV arrays/strings), e.g. input DC terminals DCin1, DCin2, DCin3, DCin4, DCin5, and DCin6. In some cases, the CRSD circuit 328 may be connected to a positive DC terminal (e.g., DC+ bus) and/or a negative terminal (e.g., DC− bus).

CRSD circuit 328 may include at least one discharge switch and at least one discharge resistor. For example, the at least one discharge resistor may be connected between a positive DC terminal (e.g., DC+ bus) and at least one discharge switch. The discharge switch may also be connected to a ground/earth potential. In other cases, discharge switch may be connected between a positive DC terminal (e.g., DC+ bus) and at least one discharge resistor, and the at least one discharge resistor may also be connected to a ground/earth potential.

As mentioned above, CRSD circuit 328 may be configured to perform discharge based on and/or in response to one or more indications that discharge should be performed, for example based on measurements done by sensing circuit 329.

According to some aspects, electrical circuit 305 may comprise sensing circuit comprising one or more sensors. For example, electrical circuit 305 may comprise sensing circuit 329 comprising one or more sensors. Sensing circuit 329 may be used to determine one or more parameter indicative of circuit 1400. Sensing circuit 329 may include, for example: a clock, a timer, a motion sensor, a magnetic sensor, a proximity sensor, a motion sensor, an irradiance sensor, a temperature sensor, a current sensor, a voltage sensor, a power sensor, etc. Based on the sensed parameter indicatives of circuit 1400, other circuits of electrical circuit 305 may operate to implement its features, for example pre-commissioning circuit 325, CRSD circuit 328, initialization of system 1400 (for example, power generation after night time), etc.

Those skilled in the art will readily appreciate that various modifications and changes can be applied to the examples described without departing from the scope, defined in and by the appended claims, of the disclosure. Further, various modifications should be readily appreciated from the following paragraphs describing various combinations of features set forth in numbered clauses.

Clause 1: A circuit comprising: a relay leg configured to connect a power source to a grid via a first switching contact controlled by a first control coil and a second switching contact controlled by a second, different control coil, wherein at least one of the first switching contact or the second switching contact comprises a switching contact of an electromechanical relay (e.g., latching relay).

Clause 2: The circuit of clause 1, wherein the circuit is connected to a single phase of the grid.

Clause 3: The circuit of clause 1, wherein the circuit is connected to three phases of the grid.

Clause 4: The circuit of clause 1, wherein the circuit is connected to three phases of the grid and to a neutral conductor.

Clause 5: The circuit of any one of the preceding clauses, wherein the latching relay is configured to change a switching contact state in response to receiving power above a threshold.

Clause 6: The circuit of any one of the preceding clauses, further comprising a control circuit configured to, based on receiving input data, control the latching relay.

Clause 7: The circuit of clause 6, wherein the control circuit comprises a power bank configured to output power to change a state of the latching relay.

Clause 8: The circuit of any one of clauses 6 or 7, wherein the control circuit comprises a monitoring circuit configured to receive a signal from a controller at predetermined intervals.

Clause 9: The circuit of any one of clauses 6-8, wherein the control circuit is configured to: control, using a first control signal, the first switching contact; and control, using a second control signal, the second switching contact.

Clause 10: The circuit of any one of the preceding clauses, further comprising a safety catch configured to prevent the latching relay from conducting.

Clause 11: The circuit of clause 10, wherein the latching relay is configured to conduct based on a removal of the safety catch.

Clause 12: The circuit of any one of the preceding clauses, further comprising an inverter configured to receive electrical power from the power source and convert a direct current (DC) power into an alternating current (AC) power.

Clause 13: The circuit of any one of the preceding clauses, further comprising a second relay leg configured to connect the power source to the grid via a third switching contact and a fourth switching contact, wherein the third switching contact of the second relay leg and the first switching contact of the first relay leg are different switching contacts of a dual-pole relay module.

Clause 14: The circuit of any one of the preceding clauses, wherein the first control coil controls a third switching contact on a second relay leg different from the relay leg.

Clause 15: The circuit of any one of the preceding clauses, wherein the first switching contact is controlled by a multi-coil latching relay.

Clause 16: A system comprising: one or more electrical devices comprising: a first control circuit; a first relay leg comprising: a first switching contact connected to a first terminal and controlled by the first control circuit; and a second relay leg comprising: a second switching contact connected to a second terminal and controlled by the first control circuit; and a connection box comprising: a second control circuit; a first connection terminal connected to a grid via a third switching contact controlled by the second control circuit, wherein the first connection terminal is connected to the first terminal; and a second connection terminal connected to the grid via a fourth switching contact controlled by the second control circuit, wherein the second connection terminal is connected to the second terminal; wherein at least one of the first switching contact, the second switching contact, the third switching contact, or the fourth switching contact comprises a switching contact of an electromechanical relay (e.g., latching relay).

Clause 17: The system of clause 16, wherein the second control circuit is configured to communicate with the first control circuit.

Clause 18: The system of any one of clauses 16 or 17, wherein the first switching contact and the second switching contact are controlled by a first control coil.

Clause 19: The system of any one of clauses 16-18, wherein the first connection terminal is connected to a third terminal of a third relay leg, wherein the second connection terminal is connected to a fourth terminal of a fourth relay leg, and wherein the third relay leg and the fourth relay leg belong to a second electrical device different from a first electrical device comprising the first relay leg and the second relay leg.

Clause 20: The system of any one of clauses 16-19, wherein the one or more electrical devices comprises: a first electrical device comprising a first inverter configured to receive electrical power from a first power source and convert a first direct current (DC) power into a second alternating current (AC) power; and a second electrical device comprising a second inverter configured to receive electrical power from a second power source and convert a second direct current (DC) power into a second alternating current (AC) power.

Clause 21: The system of any one of clauses 16-20, further comprising a power bank configured to provide a power pulse sufficient to change a state of the latching relay.

Clause 22: A method, comprising: controlling, by a control circuit using at least a first power pulse, a relay leg to connect a power source to a grid, wherein the relay leg comprises a first switching contact and a second switching contact and at least one of the first switching contact or the second switching contact comprises a switching contact of a latching relay; and controlling, by the control circuit using at least a second power pulse, the relay leg to disconnect the power source from the grid.

Clause 23: The method of clause 22, wherein the using the first power pulse comprises supplying power for 100-1000 ms.

Clause 24: An apparatus comprising: a plurality of input DC terminals configured to receive DC power; a plurality of output DC terminals configured to provide DC power to a plurality of electrical circuits; a plurality of input AC terminals configured to receive AC power from the plurality of electrical circuits; a plurality of output AC terminals configured to provide AC power to a grid; and a connection box configured to connect the plurality of input AC terminals to the plurality of output AC terminals.

Clause 25: The apparatus of clause 24, wherein the plurality of output AC terminals comprise: a first connection terminal and a second connection terminal connected to the grid; wherein the connection box comprises: a control circuit; a first relay leg comprising: a first switching contact controlled by the control circuit and connected to the first connection terminal; and a second relay leg comprising: a second switching contact controlled by the control circuit and connected to the second connection terminal.

Clause 26: The apparatus of clause 25, wherein at least one of the first switching contact and the second switching contact comprises a switching contact of a latching relay.

Clause 27: The apparatus of any of clauses 24-26, wherein the plurality of electrical circuits comprises a first electrical device comprising a first inverter configured to receive electrical power from a first power source and convert a first direct current (DC) power into a second alternating current (AC) power; and a second electrical device comprising a second inverter configured to receive electrical power from a second power source and convert a second direct current (DC) power into a second alternating current (AC) power.

Clause 28: The apparatus of any one of clauses 24-27, wherein each of the plurality of input DC terminals is configured to receive DC power from at least one of a photovoltaic solar panel, a PV module, a PV array/string, or a DC-DC converter.

Clause 29: The apparatus of any one of clauses 24-28, wherein the connection box comprises: a third relay leg comprising: a third switching contact controlled by the control circuit and connected to a third connection terminal connected to the grid.

Clause 30: The apparatus of any one of clauses 24-29, wherein the apparatus is connected to a single phase of the grid.

Clause 31: The apparatus of any one of clauses 24-30, wherein the apparatus is connected to three phases of the grid.

Clause 32: The apparatus of any one of clauses 24-31, wherein the apparatus is connected to three phases of the grid and to a neutral conductor.

Clause 33: The apparatus of any one of clauses 24-32, wherein the latching relay is configured to change a switching contact state in response to receiving power above a threshold.

Clause 34: The apparatus of any one of clauses 26-33, wherein the control circuit is configured to control, based on receiving input data, the latching relay.

Clause 35: The apparatus of any one of clauses 25-34, wherein the control circuit comprises a power bank configured to output power to change a state of the latching relay.

Clause 36: The apparatus of any one of clauses 25-35, wherein the control circuit comprises a monitoring circuit configured to receive a signal from a controller at predetermined intervals.

Clause 37: The apparatus of any one of clauses 25-36, wherein the first relay leg further comprises: a third switching contact controlled by the control circuit and connected to the first switching contact; and the second relay leg further comprises: a fourth switching contact controlled by the control circuit and connected to the second switching contact.

Clause 38: The apparatus of any one of clauses 25-36, wherein the control circuit is configured to: control, using a first control signal, the first switching contact; and control, using a second control signal, the third switching contact.

Clause 39: The apparatus of any one of clauses 25-38, wherein the control circuit is configured to: control, using the first control signal, the second switching contact; and control, using the second control signal, the fourth switching contact.

Clause 40: The apparatus of any one of clauses 26-39, further comprising a safety catch configured to prevent the latching relay from conducting.

Clause 41: The apparatus of clause 40, wherein the latching relay is configured to conduct based on a removal of the safety catch.

Clause 42: The apparatus of any one of clauses 24-41, further comprising a communication interface, wherein the communication interface comprises one of: a RS-485 communication circuit, a power-line communication circuit, a Wi-Fi communication circuit, or a Zigbee communication circuit.

Clause 43: The apparatus of any one of clauses 24-42, further comprising a fault detection circuit configured to detect an occurrence of fault or risk to the apparatus.

Clause 44: The apparatus of any one of clauses 24-43, further comprising one of an AC surge protector detection circuit, a DC surge protector detection circuit and an overheating detection circuit.

Clause 45: The apparatus of any one of clauses 24-44, further comprising a power supply configured to provide DC power.

Clause 46: The apparatus of any one of clauses 24-45, further comprising a pre-commissioning circuit configured to perform tests prior to connecting the apparatus to the grid.

Clause 47: The apparatus of any one of clauses 24-46, further comprising a potential-induced degradation (PID) circuit.

Clause 48: The apparatus of clause 47, wherein the potential-induced degradation (PID) circuit is configured to operate during nighttime.

Clause 49: The apparatus of any one of clauses 24-48, further comprising a sensing circuit configured to determine one or more parameters indicative of the apparatus.

Clause 50: The apparatus of any one of clauses 24-49, further comprising a common rapid shut down circuit configured to discharge an electrical potential due to parasitic capacitance.

Clause 51: The apparatus of clause 50, wherein the common rapid shut down circuit comprises a switch and at least one resistor.

What is claimed is:

1. A circuit comprising:
   a relay leg configured to connect a power source to a grid via a first switching contact controlled by a first control coil and a second switching contact controlled by a second control coil different from the first control coil,
   wherein at least one of the first switching contact or the second switching contact comprises a switching contact of a latching relay configured to change a switching contact state in response to receiving power above a threshold.

2. The circuit of claim 1, wherein the circuit is connected to a single phase of the grid or to three phases of the grid.

3. The circuit of claim 1,
   wherein the power is a power pulse,
   wherein the latching relay is configured to change from a first switching contact state to a second switching contact state in response to receiving the power pulse above the threshold, and
   wherein the latching relay is configured to maintain the second switching contact state after the power pulse ends.

4. The circuit of claim 1, further comprising a safety catch configured to prevent the latching relay from conducting.

5. The circuit of claim 4, wherein the latching relay is configured to conduct based on a removal of the safety catch.

6. The circuit of claim 1, further comprising an inverter configured to receive electrical power from the power source and convert a direct current (DC) power into an alternating current (AC) power.

7. The circuit of claim 1, further comprising a second relay leg configured to connect the power source to the grid via a third switching contact and a fourth switching contact, wherein the third switching contact of the second relay leg and the first switching contact of the relay leg are different switching contacts of a dual-pole relay.

8. The circuit of claim 1, wherein the first control coil controls a third switching contact on a second relay leg different from the relay leg.

9. The circuit of claim 1, wherein the first switching contact is controlled by a multi-coil latching relay.

10. The circuit of claim 1, further comprising a control circuit configured to control, based on input data, the latching relay, wherein the control circuit comprises a power bank configured to output power to change a state of the latching relay.

11. The circuit of claim 1, further comprising a control circuit configured to control, based on input data, the latching relay, wherein the control circuit comprises a monitoring circuit configured to receive a signal from a controller at predetermined intervals.

12. The circuit of claim 1, further comprising a control circuit configured to:
   control, using a first control signal, the first switching contact; and
   control, using a second control signal, the second switching contact.

13. A circuit, comprising:
   a relay leg configured to connect a power source to a grid via a first switching contact controlled by a first control coil and a second switching contact controlled by a second control coil different from the first control coil; and
   a control circuit configured to control, based on input data, a latching relay comprising
   at least one of the first switching contact or the second switching contact.

14. The circuit of claim 13, wherein the control circuit comprises a power bank configured to output power to change a state of the latching relay.

15. The circuit of claim 13, wherein the control circuit is configured to:
   control, using a first control signal, the first switching contact; and
   control, using a second control signal, the second switching contact.

16. The circuit of claim 13, wherein the latching relay is configured to change from a first switching contact state to a second switching contact state in response to receiving a power pulse and to maintain the second switching contact state after the power pulse ends.

17. The circuit of claim 13, wherein the latching relay is configured to interface with a safety catch that is configured to prevent the latching relay from conducting.

18. The circuit of claim 13, wherein the latching relay is configured to be removably coupled to a safety catch.

19. A system comprising:
   a first control circuit;
   a first relay leg comprising: a first switching contact connected to a first terminal and controlled by the first control circuit; and
   a second relay leg comprising: a second switching contact connected to a second terminal and controlled by the first control circuit; and
   a connection box comprising:
      a second control circuit;
      a first connection terminal connected to a grid via a third switching contact controlled by the second control circuit, wherein the first connection terminal is connected to the first terminal; and
      a second connection terminal connected to the grid via a fourth switching contact controlled by the second control circuit, wherein the second connection terminal is connected to the second terminal;
   wherein at least one of the first switching contact, the second switching contact, the third switching contact, or the fourth switching contact comprises a switching contact of a latching relay configured to change a switching contact state in response to receiving power above a threshold.

20. The system of claim 19, wherein the second control circuit is configured to communicate with the first control circuit.

21. The system of claim 19, wherein the first switching contact and the second switching contact are controlled by a first control coil.

22. The system of claim 19,
wherein the first connection terminal is connected to a third terminal of a third relay leg,
wherein the second connection terminal is connected to a fourth terminal of a fourth relay leg, and
wherein the third relay leg and the fourth relay leg belong to a second electrical device different from a first electrical device comprising the first relay leg and the second relay leg.

23. The system of claim 19, further comprising:
a first electrical device comprising the first relay leg; and
a second electrical device comprising the second relay leg.

* * * * *